United States Patent
Li et al.

(10) Patent No.: US 12,095,880 B2
(45) Date of Patent: Sep. 17, 2024

(54) DATA PROCESSING METHOD AND APPARATUS, DEVICE AND MEDIUM

(71) Applicant: TENCENT TECHNOLOGY (SHENZHEN) COMPANY LIMITED, Guangdong (CN)

(72) Inventors: Dan Li, Shenzhen (CN); Kailin Huang, Shenzhen (CN); Pengfei Jiang, Shenzhen (CN); Yabin Fu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/321,190

(22) Filed: May 22, 2023

(65) Prior Publication Data
US 2023/0291808 A1    Sep. 14, 2023

Related U.S. Application Data

(63) Continuation of application No. PCT/CN2022/131647, filed on Nov. 14, 2022.

(30) Foreign Application Priority Data

Jan. 21, 2022 (CN) .......................... 202210070245.6

(51) Int. Cl.
*H04L 67/56* (2022.01)
*H04L 65/1045* (2022.01)
*H04L 67/10* (2022.01)

(52) U.S. Cl.
CPC .......... *H04L 67/56* (2022.05); *H04L 65/1045* (2022.05); *H04L 67/10* (2013.01)

(58) Field of Classification Search
CPC ..... H04L 65/1045; H04L 65/80; H04L 67/10; H04L 67/141; H04L 67/148; H04L 67/56;
(Continued)

(56) References Cited

U.S. PATENT DOCUMENTS

2011/0314145 A1* 12/2011 Raleigh ............... H04L 12/1496
709/224
2017/0230235 A1* 8/2017 Khalsa ................ G06F 16/2282
(Continued)

FOREIGN PATENT DOCUMENTS

| CN | 113382026 A | 9/2021 |
|---|---|---|
| CN | 113556727 A | 10/2021 |
| CN | 114095557 A | 2/2022 |

OTHER PUBLICATIONS

First Office Action of Chinese Application No. 202210070245.6 dated Mar. 7, 2022.
(Continued)

*Primary Examiner* — Le H Luu
(74) *Attorney, Agent, or Firm* — Sughrue Mion, PLLC

(57) ABSTRACT

A data processing method, which relates to the technical field of cloud applications. The method, performed by a target edge node, includes: receiving, based on a cloud application client switching from a first type of network to a second type of network, a first connection request forwarded by a stream proxy in a transit edge node associated with the second type of network, and establishing a first communication connection between the cloud application client and the target edge node associated with the first type of network based on the first connection request, and transmitting, based on the first communication connection, application data in the cloud application between the cloud application client and the target edge node through the stream proxy.

20 Claims, 6 Drawing Sheets

(58) Field of Classification Search
CPC ..... H04L 67/02; H04L 12/1496; H04L 41/16; H04L 61/301; H04L 63/104; G05B 19/4185; G06F 16/2282; G06F 8/457; H04N 21/4532; H04W 74/04
See application file for complete search history.

(56) References Cited

U.S. PATENT DOCUMENTS

| | | | |
|---|---|---|---|
| 2017/0257886 A1* | 9/2017 | Adjakple | H04W 74/04 |
| 2017/0264619 A1* | 9/2017 | Narayanaswamy | H04L 63/104 |
| 2017/0272316 A1* | 9/2017 | Johnson | H04L 61/301 |
| 2017/0272317 A1* | 9/2017 | Singla | H04L 41/16 |
| 2017/0272792 A1* | 9/2017 | Bachmutsky | H04N 21/4532 |
| 2017/0277171 A1* | 9/2017 | Asenjo | G05B 19/4185 |
| 2017/0277562 A1* | 9/2017 | Christian | G06F 8/457 |
| 2017/0277909 A1* | 9/2017 | Kraemer | H04L 65/80 |
| 2017/0279803 A1* | 9/2017 | Desai | H04L 67/02 |
| 2021/0314301 A1 | 10/2021 | Chanak | |

OTHER PUBLICATIONS

International Search Report of PCT/CN2022/131647 dated Feb. 9, 2023 [PCT/ISA/210].
Written Opinion of PCT/CN2022/131647 dated Feb. 9, 2023 [PCT/ISA/237].

* cited by examiner

DATA PROCESSING METHOD AND APPARATUS, DEVICE AND MEDIUM

CROSS-REFERENCE TO RELATED APPLICATION(S)

This application is a continuation application of International Application No. PCT/CN2022/131647 filed on Nov. 14, 2022, which claims priority to Chinese Patent Application No. 202210070245.6, filed with China National Intellectual Property Administration on Jan. 21, 2022, the disclosures of which are incorporated by reference in their entireties.

FIELD

The disclosure relates to the field of cloud technology, and in particular to a data processing method and apparatus, a device and a medium.

BACKGROUND

A cloud application is an application based on cloud computing. In the running mode of cloud applications, all applications run on the server, and the rendered pictures are compressed and transmitted to users through the network. In the existing cloud application use scene, the user can use a mobile terminal (e.g., mobile phone) to experience cloud applications. When the mobile terminal is in a WiFi (Wireless-Fidelity) environment, the cloud application in the mobile terminal can be started through WiFi. At this time, the cloud application can be deployed in the carrier center A corresponding to this WiFi, and the mobile terminal can receive and display the pictures rendered in the carrier center A, and also transmit the user operation to the carrier center A.

If the user moves, the network of the mobile terminal may switch from WiFi to the 4 Generation mobile communication technology (4G), but the cloud application at this time still runs in the carrier center A, so that the mobile terminal using the 4G network needs to cross the carrier network to transmit data with the carrier center A. For example, first, the user operation in the mobile terminal needs to be transmitted to the carrier data conversion hotel B (the carrier data conversion hotels may be deployed in several specific cities) corresponding to the 4G network, and then the carrier data conversion hotel B forwards the user operation to the carrier center A. The carrier conversion hotel B and the carrier center A are usually located in different geographical areas. When the mobile terminal performs cross-network data transmission with the carrier center A via the carrier conversion hotel, a transmission delay and a high network packet loss rate may occur, which leads to low quality of the cloud application.

SUMMARY

Embodiments of the disclosure provide a data processing method and apparatus, a device and a medium.

Some embodiments provide a data processing method, performed by a target edge node, and includes:

receiving, based on a cloud application client switching from a first type of network to a second type of network, a first connection request forwarded by a stream proxy in a transit edge node, and establishing a first communication connection between the cloud application client and the target edge node based on the first connection request; the first connection request being transmitted by the cloud application client to the stream proxy based on the second type of network, the transit edge node being associated with the second type of network, the target edge node being associated with the first type of network, and a cloud application being deployed in the target edge node; and transmitting, based on the first communication connection, application data in the cloud application between the cloud application client and the target edge node through the stream proxy; the application data comprising first rendering data and object operation data, and the first rendering data comprising audio data and one or more rendered pictures acquired with network switching time of the cloud application client as a starting time.

Some embodiments provide a data processing apparatus, which includes: at least one memory configured to store program code; and at least one processor configured to read the program code and operate as instructed by the program code, the program code including:

first connection establishment code configured to cause the at least one processor to receive, based on a cloud application client switching from a first type of network to a second type of network, a first connection request forwarded by a stream proxy in a transit edge node, and establish a first communication connection between the cloud application client and a target edge node based on the first connection request; the transit edge node being associated with the second type of network, the target edge node being associated with the first type of network, and a cloud application being deployed in the target edge node; and data transmission code configured to cause the at least one processor to transmit, based on the first communication connection, application data in the cloud application between the cloud application client and the target edge node through the stream proxy; the application data comprising first rendering data and object operation data, and the first rendering data comprising audio data and one or more rendered pictures acquired with network switching time of the cloud application client as a starting time.

Some embodiments provide a computer device, which includes a memory and one or more processors. The memory is connected to the processor. The memory is configured to store computer-readable instructions, and the processor is configured to invoke the computer-readable instructions to cause the computer device to execute the method provided by some embodiments.

Some embodiments provide a non-transitory computer-readable storage medium, storing computer code that when executed by at least one processor causes the at least one processor to execute the method provided by some embodiments.

Some embodiments provide a computer program product, which includes computer-readable instructions. The computer-readable instructions are stored in one or more computer-readable storage media. One or more processors of the computer device read the computer-readable instructions from the computer-readable storage medium, and the processor executes the computer-readable instructions to cause the computer device to execute the method provided by some embodiments.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DETAILED DESCRIPTION

Figure 1:
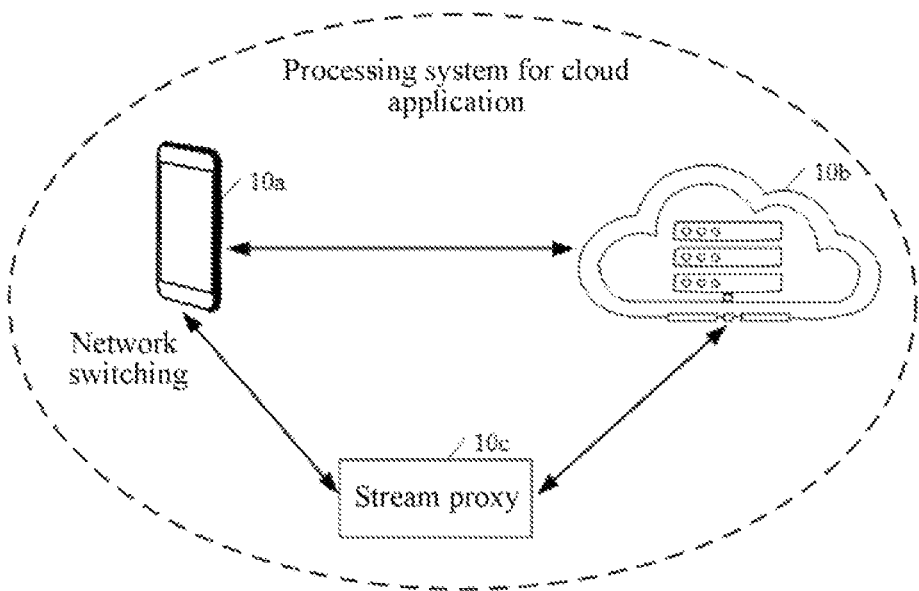
FIG. 1 is an architecture diagram of a processing system for cloud applications according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, related "some embodiments" describe a subset of all possible embodiments. However, it may be understood that the "some embodiments" may be the same subset or different subsets of all the possible embodiments, and may be combined with each other without conflict.

Embodiments of the disclosure relate to cloud computing, cloud applications and blockchains. Cloud computing is a computing mode that distributes computing tasks over a resource pool consisting of a large number of computers, so that various application systems can obtain computing power, storage space and information services as needed. The network that provides the resources is called "cloud". The resources in the "cloud" appear to be infinitely expandable to the user, and can be accessed at any time, used on demand, expanded at any time, and paid according to use. A basic ability provider of cloud computing will establish a cloud computing resource pool (referred to as cloud platform, generally known as IaaS (Infrastructure as a Service) platform, and deploy various types of virtual resources in the resource pool for external clients to choose and use. The cloud computing resource pool mainly includes: computing devices (virtual machines, including operating systems), storage devices and network devices.

As a subset of cloud computing, a cloud application is an embodiment of cloud computing technology in the application layer. The cloud application is a novel application that changes the traditional way of local software installation and local computing into a ready-to-use service and completes service logic or computing tasks by connecting and controlling a remote server cluster through the Internet or LAN. The cloud application has the following advantages: The cloud application runs in the cloud application server (which may also be referred to as the cloud), and the cloud application client runs in the terminal. The cloud application servers performs computing operations of the cloud application such as data rendering, and then transmits the computing result of the cloud application to the cloud application client to be displayed. The cloud application client collects the operation information of the user, and transmits the operation information to the cloud application server, thereby realizing the control of the cloud application by the cloud application server. Cloud applications may include cloud gaming, cloud education, cloud security, cloud conferencing, cloud calling and cloud social, etc. As a typical cloud application, cloud gaming has attracted more and more attention in recent years.

Cloud gaming, also known as gaming on demand, is an online gaming technology based on cloud computing technology. Cloud gaming enables a thin client with relatively limited graphics processing and data computing abilities to run high-quality games. In the cloud gaming scene, the game itself is not in the game terminal used by the user, but only the cloud gaming client runs in the game terminal. The real game application runs in the cloud gaming server, the cloud gaming server renders the game scene data in the cloud gaming into audio/video streams and transmits the rendered audio/video streams to the cloud gaming client, and the game terminal displays the audio/video streams received by the cloud gaming client. The cloud application client does not need to have powerful graphics computing and data processing abilities, but only needs to have basic streaming media playing abilities and the ability to acquire input instructions from the user and transmit the input instructions to the cloud gaming server. When the user experiences cloud gaming, the essence is to operate the audio/video streams of the cloud game, such as generating operation data (or user operation instructions) through touch screens, keyboards, mice, joysticks, etc., and then transmitting the operation data to the cloud gaming server through the network, thereby achieving the purpose of operating the cloud game. The game terminal involved in some embodiments may refer to a terminal device installed with a cloud gaming client. The audio/video streams may include audio streams and video streams generated in the running process of the cloud game. The audio stream may include continuous audio bands generated in the running process of the cloud game, and the video stream may include a series of game pictures (which may also be referred to as video frames) generated in the running process of the cloud game.

In the running process of the cloud application (e.g., cloud gaming), communication connection between the cloud application client and the cloud application server is involved. After the communication connection is successfully established between the cloud application client and the cloud application server, application data in the cloud application can be transmitted between the cloud application client and the cloud application server. For example, the cloud application server can transmit rendering data of the cloud application (e.g., rendered pictures in the cloud application) to the cloud application client, and the cloud application client can transmit the user's object operation data for the cloud application to the cloud application server. It is to be understood that the cloud application server may be built in the outer center. The outer center is usually jointly built by the enterprise and the carrier jointly or by the enterprise that has signed an agreement with the carrier, and only supports direct access by the objects of the carrier (e.g., clients and devices accessing the network of the carrier). That is, the outer center supports direct access of objects of only one carrier, and objects of other carriers need to access the outer center through a stream proxy. For example, when the cloud application server runs in the outer center corresponding to the carrier A, the cloud application client accessing the network of the carrier A can directly access the outer center corresponding to the carrier A, and objects accessing networks of other carriers (for example, a carrier B, etc.) need to access the outer center corresponding to the carrier A through the stream proxy in the outer center corresponding to the carrier B. The stream proxy may be deployed in the outer center corresponding to the other carriers. The stream proxy may be a server deployed in the outer center, or a module in the outer center. The stream proxy is used for forwarding data between the objects of the other carriers and the outer center where the cloud application server is deployed, i.e., the stream proxy and the cloud application server are respectively deployed in different outer centers.

A blockchain is a novel application model of distributed data storage, point-to-point transmission, consensus mechanisms, encryption algorithms and other computer technologies. A blockchain is essentially a decentralized database, which is a series of data blocks (also referred to as blocks) generated using cryptographic association. The data blocks are linked by random hashing (also called hash algorithm), and the latter block includes the encrypted hash, the corresponding timestamp and transaction data (usually indicated by the hash value calculated by Merkle tree algorithm) of the previous block, which makes the contents of the block difficult to tamper with. In some embodiments, the cloud application client and the outer centers (e.g., the outer center where the cloud application server is deployed, and the outer center where the stream proxy is deployed) can be used as blockchain nodes in the blockchain network, and information such as object operation data generated in the cloud application client and rendering data of the cloud application generated in the outer center can be uploaded to the blockchain. Because the blockchain cannot be tampered with, the security and accuracy of data can be guaranteed, so as to prevent malicious users from tampering with related data of the cloud application.

Some embodiments also involve the following concepts:

Outer Center: The outer centers may be EICs and GOCs built by the enterprise and the carrier in various cities. The outer center may also be called the edge data center or the edge node.

Web Real-Time Communication (WebRTC): WebRTC is an API (Application Programming Interface) that supports web browsers to conduct real-time voice or video conversations. WebRTC has been included in the World Wide Web Consortium's (W3C) W3C recommended standards.

Carrier: The carrier may refer to a communication service enterprise that conducts network operations and provides services. The carrier needs to know the network operation status not only from the network perspective, but also from the service perspective. The carrier involved in some embodiments may refer to a communication service company that provides fixed-line phone, mobile phone and Internet access.

Container: The container may refer to packetizing an operating system into a container image and publishing it through a standard container image. The medium may be any container shell that supports the OCI (Open Container Initiative) standard, so it can be easily operated and maintained through k8s (kubernetes, which may refer to an orchestration management tool for portable containers made for container services). With the powerful operation and maintenance tool of k8s, several thousand server clusters can be run on the cloud.

FIG. 1 is an architecture diagram of a processing system for cloud applications according to some embodiments. As shown in FIG. 1, the processing system for cloud applications, may include a terminal device 10*a*, an edge node 10*b* and a stream proxy 10*c*. The numbers of the terminal devices 10*a*, the edge nodes 10*b* and stream proxies 10*c* in the processing system for cloud applications shown in FIG. 1 is merely an example. For example, the numbers of the terminal devices, the edge nodes and stream proxies may be plural, and the numbers of the terminal devices, the edge nodes and stream proxies are not limited herein. The terminal device 10*a* may be installed with a cloud application client. The terminal device 10*a* may include, but not limited to, a smartphone (e.g., an Android mobile phone or an iOS mobile phone), a desktop computer, a tablet computer, a portable personal computer, a Mobile Internet device (MID), a wearable smart device (e.g., a smart watch and a smart bracelet), a vehicle-mounted device and other electronic devices. The type of the terminal device 10*a* in not limited herein. A cloud application server may be deployed in the edge node 10*b*. The cloud application server may provide basic cloud computing services such as cloud service, cloud database, cloud computing, cloud function, cloud storage, network service, cloud communication, middleware service, domain name service, security service, Content Delivery Network (CDN), big data and artificial intelligence platform.

As shown in FIG. 1, the terminal device 10*a* may refer to an electronic device used by a player. The player here may refer to a user who has experienced a cloud application or who requests to experience a cloud application, and one or more cloud applications may be integrated into the terminal device 10*a*. The edge node 10*b* may refer to an outer center corresponding to a carrier network used by the terminal device 10*a* when starting a cloud application. The cloud application may be deployed in the edge node 10*b*, and the essence is to build a cloud application server in the edge node 10*b*. The cloud application may run in the edge node 10*b*. For example, in a case that the terminal device 10*a* starts the cloud application client through a first type of network (e.g., a first type of carrier network), the edge node 10*b* may refer to the outer center corresponding to the first type of network (for example, the outer center at this time can be called a first type of carrier center).

The stream proxy 10*c* may be configured to forward cloud application data between the cloud application client in the terminal device 10*a* and the edge node 10*b* after the terminal device 10*a* performs network switching. For example, when terminal device 10*a* switches from a first type of network (e.g., a first type of carrier network) to a second type of network (e.g., a second type of carrier network), the cloud application in the terminal device 10*a* still runs in the edge node 10*b*. Since the second type of network used in the terminal device 10*a* and the edge node 10*b* belong to different carriers, i.e., the terminal device 10*a* cannot directly access the edge node 10*b* through the second type of network, cloud application data between the terminal device 10*a* and the edge node 10*b* may be transmitted through the stream proxy 10*c*. The cloud application data may include object operation data generated by the terminal device 10*a*, rendering data generated by the edge node 10*b*, etc.

The stream proxy 10*c* may be built in an edge node (e.g., a second type of carrier center) corresponding to the second type of network (e.g., the second type of carrier network), i.e., the stream proxy involved in some embodiments may refer to a local service built in the edge node (carrier center) to which the network to which the terminal device 10*a* is switched belongs. The type of network involved in some embodiments may refer to a carrier network. Networks corresponding to different carriers may be considered as different types of network, and the same carrier corresponds to the same type of network.

In the processing system for cloud applications shown in FIG. 1, when the carrier to which the network used by the terminal device 10*a* belongs is the same as the carrier to which the edge node 10*b* belongs, the cloud application client installed in the terminal device 10*a* can directly access the edge node 10*b*. For example, application data in the cloud application (including object operation data generated in the cloud application client and rendering data generated by the edge node 10*b*) can be directly transmitted between the cloud application client and the edge node 10*b*. When the cloud application client in the terminal device 10*a* performs network switching and the carrier to which the switched network belongs is different from the carrier to which the edge node 10*b* belongs, the cloud application client at this time cannot directly access the edge node 10*b*, but needs to access the edge node 10*b* through the stream proxy 10*c*. For example, the application data in the cloud application can be transmitted between the cloud application client in the terminal device 10*a* and the edge node 10*b* through the stream proxy 10*c*. In some embodiments, when carrier network switching occurs in the terminal device, transmitting the cloud application data through the stream proxy 10*c* can reduce the transmission delay and network packet loss rate of the cloud application, and further improve the quality of the cloud application.

Figure 2:
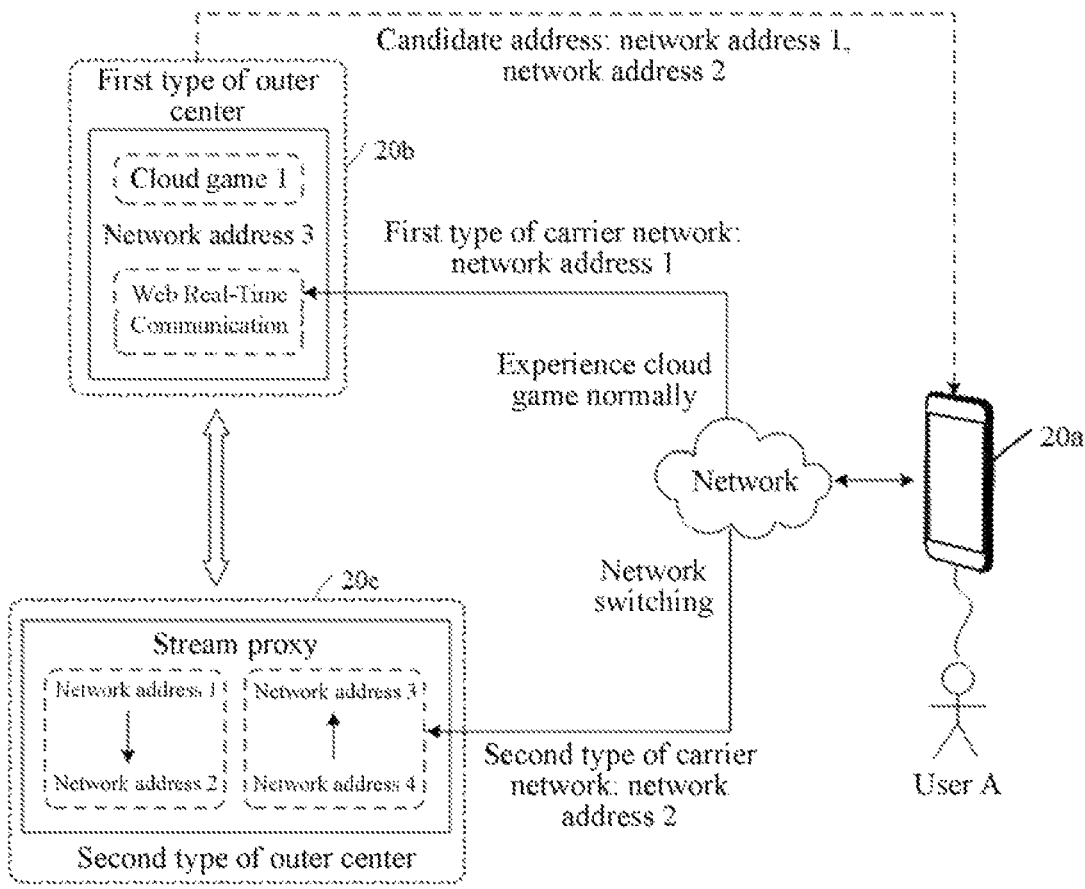
FIG. 2 is a diagram showing a network switching scene of cloud gaming according to some embodiments.

For the convenience of description, the following describes a network switching process of the cloud application in an example where the cloud application is cloud gaming. FIG. 2 is a diagram showing a network switching scene of cloud gaming according to some embodiments. As shown in FIG. 2, a terminal device 20*a* may be an electronic device used by User A (e.g., the terminal device 10*a* in the processing system for cloud applications shown in FIG. 2 above). The terminal device 20*a* may integrate one or more cloud games, such as a cloud game 1, a cloud game 2, . . . , and for example, may be installed with a plurality of cloud gaming clients. When the user A wants to experience the cloud games integrated in the terminal device 20*a*, he may select an interested cloud game (for example, the cloud game 1) among one or more cloud games integrated in the terminal device 20*a*, and execute a start operation on the cloud gaming client corresponding to the interested cloud game 1. At this time, the terminal device 20*a* may start the cloud gaming client corresponding to the cloud game 1 in response to the start operation for the cloud gaming client in a network connected state.

When the terminal device 20*a* is in the network connected state, it can be considered that the gaming client in the terminal device 20*a* has successfully accessed the carrier network. The network type supported by the terminal device 20*a* is the network type supported by the cloud gaming client. The network type may refer to networks corresponding to different carriers. The networks of the same carrier correspond to the same network type, and the same network type may include, but not limited to, WiFi, the 3 Generation mobile communication technology (3G) network, 4G network and the 5 Generation mobile communication technology (5G) network of the same carrier.

As shown in FIG. 2, assuming that the terminal device 20*a* can support the 4G network of the second type of carrier and the WiFi network of the first type of carrier or the terminal device 20*a* supports the SIM (Subscriber Identity Module) card of the first type of carrier and the SIM card of the second type of carrier, then the network type supported by the terminal device 20*a* includes the first type of carrier network and the second type of carrier network. For the convenience of description, the following describes the switching scene of the cloud gaming client between the first type of carrier network and the second type of carrier network.

As shown in FIG. 2, when the terminal device 20*a* starts the cloud gaming client corresponding to the cloud game 1 through the first type of carrier network, a first type of outer center 20*b* (also be called a first type of edge node) which has the shortest distance from the terminal device 20*a* can be determined within a geographical area range (e.g., city) to which the terminal device 20*a* belongs, and a connection request can be transmitted to the first type of outer center 20*b* (the connection request at this time can be called a second connection request). This second connection request can be used for instructing establishment of a communication connection between the first type of outer center 20*b* and the cloud gaming client. After the communication connection is established between the first type of outer center 20*b* and the cloud gaming client, a cloud gaming server corresponding to the cloud game 1 may be started in the first type of outer center 20*b*, i.e., the cloud game 1 may be run in the first type of outer center 20*b*. Rendered data corresponding to the cloud game 1 (the rendering data at this time may be audio/video stream data) may be generated by rendering technology in the first type of outer center 20*b*. In this case, the rendering data may be transmitted to the cloud gaming client in the terminal device 20*a* through a WebRTC interface in the first type of outer center 20*b*, and displayed to User A in the cloud gaming client. User A may watch the audio/video stream data of the cloud game 1 in the cloud gaming client and operate the audio/video stream data displayed by the cloud gaming client, so that the cloud gaming client generates object operation data for User A, for example, operation instructions generated when the user triggers a specific skill function control in a game page corresponding to the cloud game 1.

Before the first type of outer center 20*b* transmits the audio/video stream data of the cloud game 1 to the cloud gaming client, the first type of outer center 20*b* may acquire the network type supported by the terminal device 20*a*, such as the first type of carrier network and the second type of carrier network. For the cloud gaming client in the terminal device 20*a*, different network types may correspond to different network addresses, i.e., the cloud gaming client may correspond to different network addresses in different carrier networks. The network address may include an IP address (Internet Protocol Address) and a port number. For example, the network address of the cloud gaming client in the first type of carrier network may be denoted as a network address 1, and the network address of the cloud gaming client in the second type of carrier network may be denoted as a network address 2. Similarly, outer centers corresponding to the carriers may correspond to different network addresses. For example, the network address corresponding to the first type of outer center 20*b* may be denoted as a network address 3, and the network address corresponding to the second type of outer center 20*c* may be denoted as a network address 4. Since the cloud game 1 started by the terminal device 20a runs in the first type of outer center 20b, router registration information may be set for the cloud gaming client and the first type of outer center 20b in the stream proxy included in the second type of outer center 20c. The router registration information may include routing and forwarding information between the network address 4 and the network address 3, and routing and forwarding information between the network address 1 and the network address 2. The stream proxy in the second type of outer center 20c may be pre-built. The router registration information may be used for setting routing and forwarding rules between different machines (e.g., the cloud gaming client and the first type of outer center 20b). The routing and forwarding rules may also be called routing and forwarding information. The routing and forwarding information is used for indicating association relationships between network addresses corresponding to different machines.

As shown in FIG. 2, when the terminal device 20a starts the cloud gaming client of the cloud game 1 through the first type of carrier network and the cloud game 1 runs in the first type of outer center 20b, the communication connection between the cloud gaming client and the first type of outer center 20b is realized through the network address 1 and the network address 3. For example, the audio/video stream data generated by the cloud game 1 running in the first type of outer center 20b may be transmitted to the cloud gaming client corresponding to the network address 1 through the network address 3; and the object operation data generated by the cloud gaming client may be transmitted to the first type of outer center 20b corresponding to the network address 3 through the network address 1.

In some embodiments, when the movement of User A causes the terminal device 20a to be out of the coverage of the first type of carrier network (e.g., beyond the WiFi coverage of the first type of carrier) or the first type of carrier network used by the terminal device 20a is not stable, the cloud gaming client may perform network switching, for example, may switch from the first type of carrier network to the second type of carrier network supported by the cloud gaming client. When the cloud gaming client switches from the first type of carrier network to the second type of carrier network, the cloud game 1 in the terminal device 20a still runs in the first type of outer center 20b, and the cloud gaming client cannot directly access the first type of outer center 20b through the second type of carrier network. Therefore, a communication connection between the cloud gaming client and the first type of outer center 20b can be established through the stream proxy in the second type of outer center 20c, and thereby, game data (such as object operation data generated by the cloud gaming client, audio/video stream data generated by the first type of outer center 20b, etc.) in the cloud game can be transmitted between the cloud gaming client and the first type of outer center 20b through the stream proxy in the second type of outer center 20c. The network address of the cloud gaming client after network switching becomes the network address 2. In other words, when network switching of the cloud gaming client is detected, network switching time of the cloud gaming client may be recorded, and audio/video stream data generated by the first type of outer center 20b after the network switching time needs to be transmitted to the stream proxy in the second type of outer center 20c through a WebRTC interface.

The address to which the audio/video stream data acquired by the stream proxy in the second type of outer center 20c points is the network address 1, and the address to which the audio stream data points may be changed from the network address 1 to the network address 2 according to the routing and forwarding information included in the router registration information, so that the stream proxy forwards the audio/video stream data to the cloud gaming client corresponding to the network address 2. Similarly, the object operation data generated by the cloud gaming client after network switching firstly needs to be transmitted to the stream proxy in the second type of outer center 20c. The address to which the object operation data acquired by the stream proxy points is the network address 4. The address to which the object operation data points may be changed from the network address 4 to the network address 3 in the stream proxy according to the routing and forwarding information included in the router registration information, so that the stream proxy forwards the object operation data to the first type of outer center 20b corresponding to the network address 3.

In some embodiments, when the cloud gaming client switches between different carrier networks, cloud game data can be transmitted between the cloud gaming client and the outer center using different carrier networks through the stream proxy, and there is no need of cross-network transmission, which can reduce the transmission delay and network packet loss rate of the cloud game and further improve the quality of the cloud game.

Figure 3:
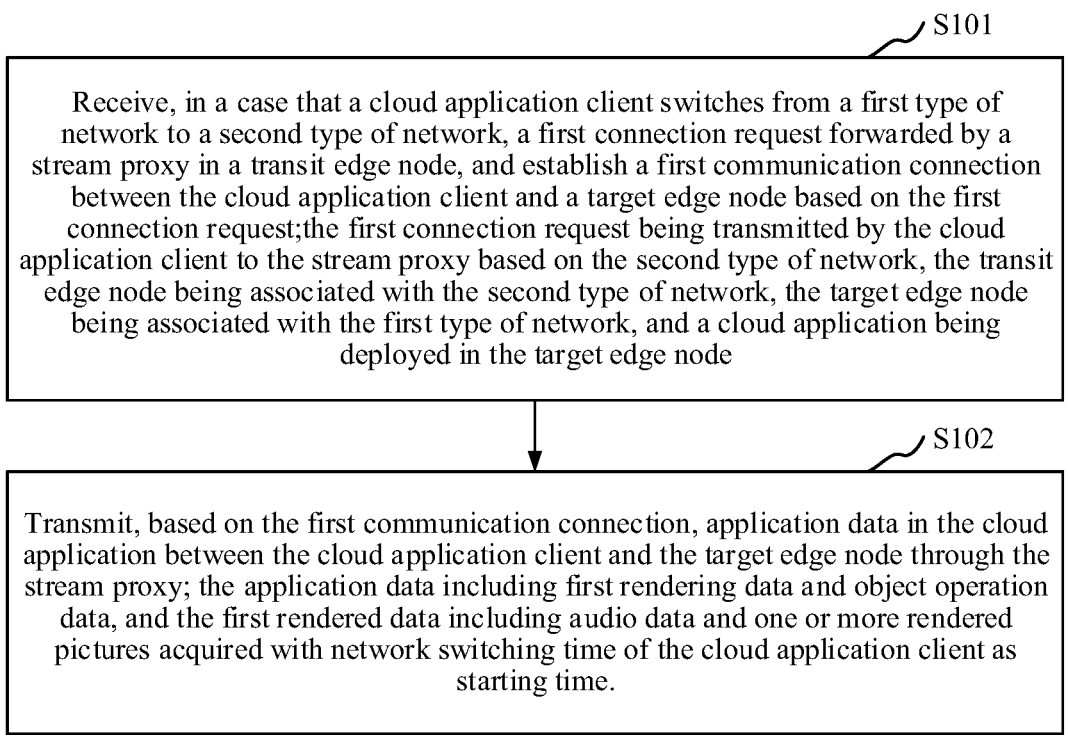
FIG. 3 is a schematic flowchart of a data processing method according to some embodiments.

FIG. 3 is a schematic flowchart of a data processing method according to some embodiments. It is to be understood that the data processing method may be executed by a target edge node (e.g., the first type of outer center 20b in the embodiment corresponding to FIG. 2 above) where a cloud application is deployed. As shown in FIG. 3, the data processing method may include operation S101 to operation S102 as follows:

Operation S101: Receive, in a case that a cloud application client switches from a first type of network to a second type of network, a first connection request forwarded by a stream proxy in a transit edge node, and establish a first communication connection between the cloud application client and a target edge node based on the first connection request, the first connection request being transmitted by the cloud application client to the stream proxy based on the second type of network, the transit edge node being associated with the second type of network, the target edge node being associated with the first type of network, and a cloud application being deployed in the target edge node.

In some embodiments, when one or more cloud applications are integrated in the terminal device used by the user, the cloud application client corresponding to the cloud application may be started through the terminal device. When the user executes a start operation on the cloud application client integrated in the terminal device, the terminal device may start, in response to the start operation for the cloud application client, the cloud application client triggered by the user through the first type of network (e.g., the first type of carrier network in the embodiment corresponding to FIG. 2 above), and acquire M edge nodes corresponding to the first type of network within the geographic area range to which the cloud application client belongs. M is a positive integer. For example, M may be 1, 2, . . . . The geographic area range may refer to a geographic area where edge nodes (outer centers) are deployed, such as the city, town or county to which the cloud application client belongs. For example, when the first type of network is the first type of carrier network, the M edge nodes may refer to all outer centers corresponding to the first type of carrier in the city to which the cloud application client belongs.

Further, distances between the cloud application client and the M edge nodes respectively may be acquired, and the edge node corresponding to the shortest distance is determined as the target edge node for running the cloud application. In other words, within the geographic area range to which the cloud application client belongs, the edge node having the shortest distance from the cloud application client in the cloud application client is determined as the target edge node for running the cloud application. By reducing the distance between the cloud application client and the target edge node for running the cloud application, the transmission time of the cloud application data between the cloud application client and the target edge node can be reduced, and thereby, the experience effect of the cloud application can be improved.

Further, before the cloud application client switches from the first type of network to the second type of network, the cloud application client may transmit a second connection request to the target edge node through the first type of network. After receiving the second connection request transmitted by the cloud application client, the target edge node may acquire a second client network address (e.g., the network address 1 in the embodiment corresponding to FIG. 2 above) corresponding to the second connection request, and establish a second communication connection between the cloud application client and the target edge node through the second client network address and the first node network address (e.g., the network address 3 in the embodiment corresponding to FIG. 2 above). The second client network address is used for characterizing a network address of the cloud application client in the first type of network. It is to be understood that after receiving the second connection request, if the target edge node agrees to establish a communication connection with the cloud application client (the communication connection at this time may be called the second communication connection), it may return connected callback information to the cloud application client. When the cloud application client receives the callback information, it indicates that the cloud application client has successfully established the second communication connection with the target edge node through the first type of network.

In some embodiments, when the cloud application client is started through the first type of network, the second connection request transmitted through the first type of network is received, the second client network address corresponding to the second connection request is acquired, and the second communication connection between the cloud application client and the target edge node is established through the second client network address and the first node network address corresponding to the target edge node, which can increase the success rate of establishing the second communication connection.

After establishing the second communication connection with the target edge node through the first type of network, the cloud application client may transmit parameter information corresponding to the cloud application to the target edge node. The parameter information corresponding to the cloud application may include an application identifier (ID) corresponding to the cloud application, a user identifier (e.g., user account, user ID, etc.) for logging in the cloud application, etc. The target edge node may acquire the parameter information corresponding to the cloud application transmitted by the cloud application client. According to the parameter information, the cloud application corresponding to the cloud application client can be run in the target edge node, and service logic corresponding to the cloud application can be executed to obtain service scene data in the cloud application. One cloud application may include one or more application scenes. Different application scenes may correspond to different function controls. Data corresponding to each application scene may be called application scene data. Different application scenes may correspond to different application scene data. For example, the application scene data may include information such as a function control corresponding to the application scenes, scene display elements, etc. In some embodiments, after the parameter information corresponding to the cloud application is acquired, in the target edge node corresponding to the first type of network, a container matched with the cloud application is started based on the parameter information, and application logic corresponding to the cloud application is executed in the container to obtain the application scene data in the cloud application. Each container in the target edge node may correspond to one cloud application, and each cloud application has a unique application ID. Then based on the application ID included in the parameter information, the container matched with the application ID may be started, and the application logic corresponding to the cloud application logged in with the user ID in the parameter information is executed in the container.

In some embodiments, when the second communication connection is established between the cloud application client and the target edge node through the first type of network, the container matched with the cloud application is started in the target edge node according to the parameter information corresponding to the cloud application, and the service logic corresponding to the cloud application is executed in the container to obtain the service scene data in the cloud application, thereby improving the quality of the cloud application. After the application scene data is obtained, rendering technology in the container may be used to render the application scene data to obtain rendering data corresponding to the cloud application (for the convenience of description, the rendering data here may be called second rendering data, and the second rendering data may be rendered audio/video stream data in the cloud application), and the second rendering data is transmitted to the cloud application client through the communication session interface (e.g., the WebRTC interface) in the target edge node, so that the cloud application client outputs the second rendering data when receiving the second rendering data. The second rendering data may include audio stream data and video stream data in the cloud application. The video stream data may include a plurality of rendered pictures in the cloud application, i.e., the cloud application client may display the rendered pictures in the second rendering data in real time and play the audio data corresponding thereto. In some embodiments, the second rendering data may not include audio stream data. In this case, the cloud application client receives only the video stream data transmitted by the target edge node, and the rendered pictures included in the video stream data may be displayed in the cloud application client. The rendered pictures displayed by the cloud application client is kept in the same running progress as the cloud application in the target edge node.

In some embodiments, when the second communication connection is established between the cloud application client and the target edge node through the first type of network, the service logic corresponding to the cloud application is executed in the target edge node to obtain the service scene data in the cloud application, and further, the service scene data is rendered to obtain the second rendering data corresponding to the cloud application. The second rendering data may be transmitted to the cloud application client through the communication session interface corresponding to the target edge node, so that the cloud application client quickly outputs the second rendering data, thereby improving the quality of the cloud application.

It is to be understood that the cloud application may run in k8s. By a container virtualization technology, the cloud application is installed in a cloud application container, and an initializer can be attached to help initialize the cloud application when it is started. Both the cloud application container and the initializer run in an ARM (Advanced RISC Machine) server. The essence of the cloud application is that the cloud application itself runs in a cloud application server built in a cloud center (i.e., outer center). The cloud center may collect rendering data of the cloud application and transmit the rendering data to the cloud application client through WebRTC. From the user's perspective, the essence of experiencing a cloud application is to experience real-time audio/video stream data. In order to reduce the transmission delay of the audio/video stream data, the cloud application may be deployed in the outer center (target edge node) having the shortest distance from the cloud application client.

In some embodiments, if the cloud application client moves beyond the coverage of the first type of network or the first type of network used by the cloud application client is not stable, then the cloud application client may perform network switching, for example, switch from the first type of network to the second type of network (e.g., the second type of carrier network in the embodiment corresponding to FIG. 2 above). The second type of network is the carrier network supported by the cloud application client, and the cloud application accessing the second type of network still runs in the target edge node. In other words, the cloud application client may perform network switching because the first type of network fails or the cloud application client moves beyond the coverage of the first type of network.

When the cloud application client switches from the first type of network to the second type of network, the second communication connection between the cloud application client and the target edge node may be disabled, and a connection request (the connection request here may be called the first connection request) may be retransmitted to the target edge node through the stream proxy in the transit edge node (e.g., the second type of outer center 20c in the embodiment corresponding to FIG. 2 above). When the target edge node receives the first connection request forwarded by the stream proxy in the transit edge node, a first communication connection between the cloud application client and the target edge node may be established based on the first connection request. At this time, the first communication connection is established through the second type of network and the stream proxy. The transit edge node refers to an edge node having the shortest distance from the cloud application client among the edge nodes associated with the second type of network within the geographic area range to which the cloud application client belongs.

When the cloud application client switches from the first type of network to the second type of network, the cloud application client may actively disable the second communication connection with the target edge node or passively disable the second communication connection with the target edge node. After the second communication connection between the cloud application client and the target edge node is disabled, the target edge node may receive the first connection request forwarded by the stream proxy in the transit edge node and acquire the client network address corresponding to the first connection request. The first client network address is used for characterizing a network address of the cloud application client in the second type of network. Further, a first node network address corresponding to the target edge node may be acquired, and the first communication connection between the cloud application client and the target edge node may be established through the first client network address and the first node network address corresponding to the target edge node.

It is to be understood that since the network accessed by the cloud application client after network switching is the second type of network and the network corresponding to the target edge node is the first type of network, that is, the cloud application client cannot directly access the target edge node after network switching, the cloud application client may transmit the first connection request to the stream proxy in the transit edge node, and the stream proxy in the transit edge node may forward the first connection request to the target edge node after receiving the first connection request. After receiving the first connection request forwarded by the stream proxy, if the target edge node agrees to establish a communication connection (which may be called the first communication connection) with the cloud application client, it may return connected callback information to the cloud application client through the stream proxy in the transit edge node. When the cloud application client receives the callback information forwarded by the stream proxy, it indicates that the cloud application client has successfully established the first communication connection with the target edge node through the second type of network. If the target edge node disagrees to establish a communication connection with the cloud application client after receiving the first connection request, it indicates that the cloud application client has failed to establish the communication connection with the target edge node.

In some embodiments, when the cloud application client switches from the first type of network to the second type of network, the second communication connection established between the cloud application client and the target edge node through the first type of network is disabled, so that the first communication connection between the cloud application client and the target edge node can be quickly established subsequently based on the first connection request forwarded by the stream proxy. When the first communication connection between the cloud application client and the target edge node is established, establishing the first communication connection between the cloud application client and the target edge node through the first client network address corresponding to the first connection request and the first node network address corresponding to the target edge node can increase the success rate of establishing the first communication connection, which further reduces the transmission delay and network packet loss rate of the cloud application and improves the quality of the cloud application.

In some embodiments, when the networks of the cloud application client before and after network switching are the same type of network, for example, the cloud application client switches from the WiFi network of the first type of carrier to the 4G network of the first type of carrier, the cloud application client may directly access the target edge node through the switched network (e.g., the 4G network of the first type of carrier). Therefore, there is no need to establish the communication connection with the target edge node through the stream proxy in the transit edge node. Moreover, the application data in the cloud application can be transmitted between the cloud application client and the target edge node directly instead of being based on the stream proxy.

Operation S102: Transmit, based on the first communication connection, application data in the cloud application between the cloud application client and the target edge node through the stream proxy, the application data including first rendering data and object operation data, and the first rendering data including audio data and one or more rendered pictures acquired with network switching time of the cloud application client as starting time.

In some embodiments, the network accessed by the cloud application client is switched to the second type of network, and the cloud application corresponding to the cloud application client runs in the target edge node corresponding to the first type of network, i.e., the networks used by the target edge node and the cloud application client are different carrier networks. Therefore, after the first communication connection is established between the cloud application client and the target edge node, the application data in the cloud application may be transmitted between the cloud application client and the target edge node through the stream proxy in the transit edge node. The application data may include object operation data generated by the cloud application client based on a trigger operation in the cloud application display page, first rendering data generated by the target edge node through a rendering technology, etc.

In some embodiments, the application data may include first rendering data generated by the target edge node. When the cloud application client switches from the first type of network to the second type of network, network switching time corresponding to the cloud application client may be recorded, and when the target edge node is run in the target edge node, audio data and one or more rendered pictures in the cloud application may be acquired with the network switching time as starting time, and the audio data and the one or more rendered pictures may be combined into the first rendering data corresponding to the cloud application. Thereby, the first rendering data may be transmitted to the stream proxy in the transit edge node corresponding to the second type of network through the communication session interface (e.g., a WebRTC interface) in the target edge node first, and then the first rendering data may be forwarded to the cloud application client through routing and forwarding information included in the stream proxy. After receiving the first rendering data forwarded by the stream proxy, the cloud application client may decode the first rendering data and output the decoded first rendering data. The first rendering data here and the second rendering data above may both refer to audio/video stream data generated based on the service scene data in the cloud application, but the first rendering data is generated by the target edge node after the cloud application client performs network switching, and the second rendering data is generated by the target edge node before the cloud application client performs network switching.

In some embodiments, the audio data and the one or more rendered pictures in the cloud application are acquired with the network switching time corresponding to the cloud application client as the starting time in the target edge node, and the audio data and the one or more rendered pictures are combined into the first rendering data, which can improve the accuracy of acquiring the first rendering data. Thereby, the first rendering data is transmitted to the stream proxy through the first communication connection, so that the stream proxy changes a source address corresponding to the first rendering data from the second client network address to the first client network address, and the first rendering data is forwarded to the cloud application client based on the first client network address, which improves the accuracy of forwarding the first rendering data and further improves the quality of the cloud application.

In some embodiments, the application data may include object operation data generated by the cloud application client. A display page of the cloud application (which may also be called a cloud application display page) may be displayed in the cloud application client. The display page may be used for outputting rendered pictures received by the cloud application client. The user may perform a trigger operation on the rendered picture outputted by the display page, for example, execute a trigger operation on a function control in the rendered picture. At this time, the cloud application client may generate the object operation data corresponding to the cloud application in response to the trigger operation for the rendered picture. The cloud application client may transmit the object operation data to the stream proxy in the transit edge node first, and then the object operation data is forwarded to the target edge node through the routing and forwarding information included in the stream proxy.

In the embodiment, after the object operation data is transmitted to the stream proxy by the cloud application client, a destination address of the object operation data is changed from the second node network address corresponding to the transit edge node to the first node network address, and thereby, the object operation data forwarded by the stream proxy through the first node network address corresponding to the target edge node is acquired through the first communication connection, so that when the cloud application client performs network switching, the object operation data of the cloud application can be transmitted between different types of network through the stream proxy in the transit edge node corresponding to the switched network, which can further improve the quality of the cloud application.

A local stream proxy may be pre-built in the transit edge node corresponding to the second type of network. The stream proxy in the transit edge node may be used to proxy the application data between the target edge node and the cloud application client. The target edge node in some embodiments may be a cooperative outer center of the developer enterprise of the cloud application and the carrier corresponding to the first type of network, and the transit edge node may be a cooperative outer center of the developer enterprise of the cloud application and the carrier corresponding to the second type of network. The stream proxy in the transit edge node may be a server deployed in the transit edge node. Each edge node within the geographic area range to which the cloud application client belongs can have an external network exit for the other carriers, and directly access the destination center associated with different carriers based on the city backbone network (which can be regarded as a metropolitan area network). For example, the single target edge node and the stream proxy in the transit edge node may form a virtual three-network center, and the stream proxy may directly access the destination center (e.g., the target edge node) through the city backbone network. In this case, the cloud application client does not need cross-network access when switching between any types of network (carrier networks), and the cloud application data can be transmitted only through the stream proxy in the transit edge node, which can reduce the transmission delay and network packet loss rate.

In some embodiments, when the cloud application client performs network switching, the application data of the cloud application can be transmitted between different types of network through the stream proxy in the transit edge node corresponding to the switched network, i.e., the cloud application data can be transmitted between the cloud application client after network switching and the target edge node without cross-network access, which can reduce the transmission delay and network packet loss rate of the cloud application and further improve the quality of the cloud application.

Figure 4:
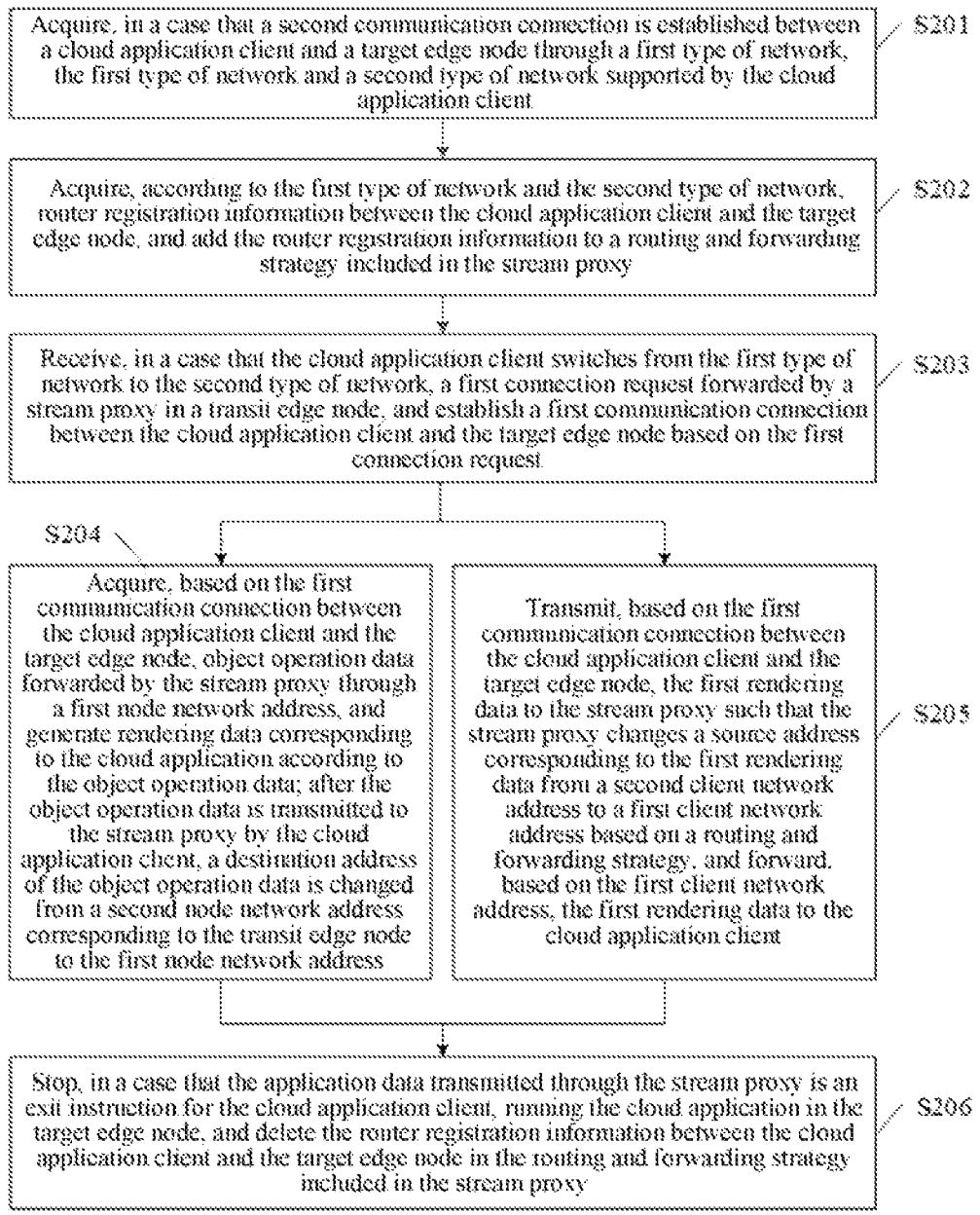
FIG. 4 is a schematic flowchart of another data processing method according to some embodiments.

FIG. 4 is a schematic flowchart of another processing method according to some embodiments. It is to be understood that the data processing method may be executed by a target edge node (e.g., the first type of outer center 20b in the embodiment corresponding to FIG. 2 above) where a cloud application is deployed. As shown in FIG. 4, the data processing method may include operation S201 to operation S206 as follows:

Operation S201: Acquire, in a case that a second communication connection is established between the cloud application client and the target edge node through the first type of network, the first type of network and the second type of network supported by the cloud application client.

In some embodiments, when the user executes a start operation on the cloud application client installed in the terminal device, the terminal device may start the cloud application client triggered by the user through the first type of network in response to the start operation for the cloud application client, and transmit a second connection request to the target edge node within the geographic area range to which the cloud application client belongs through the first type of network. After receiving the second connection request, the target edge node may establish the second communication connection between the cloud application client and the target edge node through the second client network address (the network address of the cloud application client in the first type of network) corresponding to the second connection request and the first node network address corresponding to the target edge node.

After the second communication connection between the cloud application client and the target edge node is established through the first type of network, the cloud application client may transmit parameter information of the cloud application corresponding to the cloud application client to the target edge node based on the second communication connection. The target edge node may start a container corresponding to the cloud application based on an application identifier (ID) in the parameter information, and in the container, the cloud application corresponding to the cloud application client may be initialized, and the initialized cloud application may be run. The initializing the cloud application may refer to setting initial information of the cloud application client based on information such as the permission of the user corresponding to the cloud application client in the permission, the user identifier, etc. Before the cloud application is run in the target edge node and the rendering data is transmitted to the cloud application client, all network types supported by the cloud application client may be acquired. There may be one or more of different types of carrier networks, and the number and type of the network types are not limited thereto.

In some embodiments, if the number of the network types supported by the cloud application client is 2, then the two network types supported by the cloud application client may be called a first type of network and a second type of network. For example, when the cloud application client supports Dual SIM Dual Standby and the cloud application client carries a SIM card of the second type of carrier and a SIM card of a third type of carrier (the SIM card of the second type of carrier may be the default SIM card of the cloud application client), the second type of carrier network may be called the first type of network, and the third type of carrier network may be called the second type of network. If the number of the network types supported by the cloud application client is 3, then the three network types supported by the cloud application client may be called a first type of network, a second type of network and a third type of network. For example, when the cloud application client is in a WiFi environment of the first type of carrier and carries a SIM card of a second type of carrier and a SIM card of a third type of carrier, the first type of carrier network may be called the first type of network, the second type of carrier network may be called the second type of network, and the third type of carrier network may be called the third type of network. For the convenience of description, some embodiments are described in an example where the cloud application client supports two network types, for example, the networks supported by the cloud application client are the first type of network and the second type of network.

Operation S202: Acquire, according to the first type of network and the second type of network, router registration information between the cloud application client and the target edge node, and add the router registration information to a routing and forwarding strategy included in the stream proxy.

In some embodiments, after the first type of network and the second type of network supported by the cloud application client are acquired, the router registration information between the cloud application client and the target edge node may be acquired according to the first type of network and the second type of network, and the router registration information may be added to the stream proxy in the transit edge node. The stream proxy in the transit edge node may be pre-built. The router registration information between the cloud application client and the target edge node may include routing and forwarding information of different carrier networks.

In some embodiments, when the second communication connection is established between the cloud application client and the target edge node through the first type of network, the router registration information between the cloud application client and the target edge node is acquired through the first type of network and the second type of network supported by the cloud application client, and the router registration information is added to the routing and forwarding strategy included in the stream proxy, so that when the cloud application client performs network switching, the application data of the cloud application may be transmitted between different types of network through the stream proxy in the transit edge node corresponding to the switched network, thereby improving the quality of the cloud application.

In some embodiments, the target edge node may acquire a second client network address (e.g., the network address 1 in the embodiment corresponding to FIG. 2 above) of the cloud application client in the first type of network, and a first client network address (e.g., the network address 2 in the embodiment corresponding to FIG. 2 above) of the cloud application client in the second type of network. Of course, the target edge node may also acquire a second node network address (e.g., the network address 4 in the embodiment corresponding to FIG. 2 above) corresponding to the transit edge node, and a first node network address (e.g., the network address 3 in the embodiment corresponding to FIG. 2 above) corresponding to the target edge node. Further, the first routing and forwarding information between the cloud application client and the target edge node, i.e., a routing and forwarding relationship between the first node network address and the second node network address, may be generated according to the first node network address corresponding to the target edge node and the second node network address corresponding to the transit edge node; and the second routing and forwarding information between the target edge node and the cloud application client, i.e., a routing and forwarding relationship between the first client network address and the second client network address, may be generated according to the first client network address and the second client network address. Thereby, the first routing and forwarding information and the second routing and forwarding information may be determined as the router registration information between the cloud application client and the target edge node. In other words, when the cloud application client is started through the first type of network and the cloud application corresponding to the cloud application client is run in the target edge node, the routing and forwarding information may be added for the cloud application client and the target edge node in the stream proxy of the transit edge node.

Figure 5:
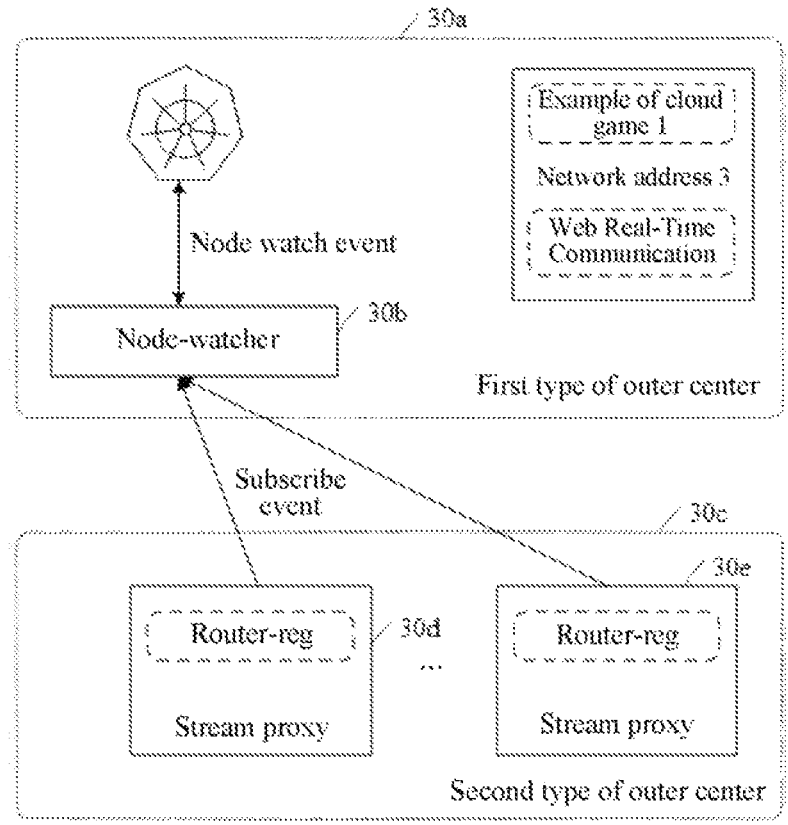
FIG. 5 is a schematic diagram showing registration of router registration information according to some embodiments.

FIG. 5 is a schematic diagram showing registration of router registration information according to some embodiments. The registration process of the router registration information in the stream proxy will be described in an example where the cloud application is a cloud game. As shown in FIG. 5, assuming that a cloud game 1 triggered by the user is started through the first type of carrier network (i.e., the above-mentioned first type of network), i.e., a cloud gaming client corresponding to the cloud game 1 is started, the cloud game 1 is run in the first type of outer center 30a (i.e., the above-mentioned target edge node, for example, the outer center corresponding to the first type of carrier network) and the cloud application client also supports the second type of carrier network (i.e., the above-mentioned second type of network), then before the cloud game 1 is run in the first type of outer center 30a and rendering data (audio/video stream data) corresponding to the cloud game 1 is transmitted to the cloud application client, it is required to add the router registration information between the cloud application client and the first type of outer center 30a to the stream proxy in the second type of outer center 30c (i.e., the above-mentioned transit edge node). The first type of outer center 30a may run an example of the cloud game 1. The network address of the first type of outer center 30a may be denoted as the network address 3 (i.e., the first node network address). The first type of outer center 30a may further include a WebRTC interface for real-time voice conversation or video conversation. The example here may refer to a program that supports the running of the cloud game.

As shown in FIG. 5, the process of adding the router registration information between the cloud application client and the target edge node may include: according to the event system of k8s, a node-watcher 30b may be run in the first type of outer center 30a. The node-watcher 30b may provide at least the following two functions: (1) The node-watcher 30b may provide a node addition and deletion event, and acquire the network address of the node from the event. The event in some embodiments may be regarded as a perceivable operation. The node here may include the cloud application client corresponding to the cloud game 1, the first type of outer center 30a that runs the cloud game 1, the second type of outer center 30c corresponding to the second type of carrier network, and other devices. (2) The node-watcher may provide a subscribe function, such as a subscribe event. The outer center (e.g., the second outer center) where the stream proxy is located provides a subscribe node deletion and addition event, and when the event occurs, the event may be notified to the stream proxy in the second type of outer center 30c in real time.

In some embodiments, in the second type of outer center 30c, one or more peer-to-peer stream proxies may be built. For example, a stream proxy 30d, a stream proxy 30e, etc. may be built in the second type of outer center 30c. This can avoid a single point of failure and too heavy traffic in the single stream proxy. Each stream proxy can run a program router-reg of deamonset. The router-reg may add and delete, according to the event notified by the node-watcher 30b, the routing and forwarding strategy, such as iptables (which may be regarded as a firewall or a client proxy) rules, and can be used for maintaining the availability of network forwarding. The router-reg may also subscribe a node addition and deletion event from the node-watcher 30b. The deamonset can ensure that all or part of nodes can each run one pod replica. One pod replica may be a group of containers. The pod replica may also refer to the smallest unit of k8s operation. For example, the cloud application client corresponding to the cloud game 1, the first type of outer center 30a that runs the cloud game 1, and the second type of outer center 30c including the stream proxy can all be used as the node in the node addition event, and the router registration information corresponding to the node is added to the stream proxy through the program router-reg that runs in the stream proxy. The router registration information may include routing and forwarding information when the cloud application client transmits cloud game data to the first type of outer center 30a through the second type of carrier network, for example, the first routing and forwarding information when the cloud application client transmits the object operation data to the first type of outer center 30a through the second type of carrier network, and the second routing and forwarding information when the first type of outer center 30a transmits the rendering data to the cloud application client that uses the second type of carrier network.

In some embodiments, the first routing and forwarding information between the cloud application client and the target edge node is generated through the first node network address corresponding to the target edge node and the second node network address corresponding to the transit edge node, which can improve the accuracy of generating the first routing and forwarding information. The second routing and forwarding information between the cloud application client and the target edge node is generated through the second client network address of the cloud application client in the first type of network and the first client network address of the cloud application client in the second type of network, which can improve the accuracy of generating the second routing and forwarding information. Further, the first routing and forwarding information and the second routing and forwarding information are determined as the router registration information between the cloud application client and the target edge node, which can further improve the accuracy of generating the router registration information and improve the quality of the cloud application.

In some embodiments, if the cloud application client also supports the third type of network (e.g., the third type of carrier network), a candidate edge node corresponding to the third type of network may be determined within the geographic area range to which the cloud application client belongs, and then the same operation as described above may be executed to add the router registration information between the cloud application client and the target edge node to the stream proxy of the candidate edge node. The router registration information added to the stream proxy of the candidate edge node may include the routing and forwarding information when the cloud application client transmits the cloud game data to the target edge node through the third type of network, for example, third routing and forwarding information when the cloud application client transmits the object operation data to the target edge node through the third type of network, and fourth routing and forwarding information when the target edge node transmits the rendering data to the cloud application client that uses the third type of network.

Operation S203: Receive, in a case that the cloud application client switches from the first type of network to the second type of network, a first connection request forwarded by the stream proxy in the transit edge node, and establish a first communication connection between the cloud application client and the target edge node based on the first connection request.

In some embodiments, when the cloud application client moves beyond the coverage of the first type of network, the cloud application client may automatically switch from the first type of network to the second type of network (the second type of network is the network type supported by the cloud application client); alternatively, when the first type of network used by the cloud application client is not stable, the cloud application client may also switch from the first type of network to the second type of network, which, for example, has a better connectivity than the first type of network; alternatively, when the user executes a trigger operation on a network switching control in the terminal device installed with the cloud application client, the terminal device may switch from the first type of network to the second type of network determined by the trigger operation in response to the trigger operation for the network switching control. After the network accessed by the cloud application client is switched to the second type of network, the first connection request may be transmitted to the stream proxy in the transit edge node through the second type of network. After receiving the first connection request, the stream proxy in the transit edge node may forward the first connection request to the target edge node corresponding to the first type of network. After receiving the first connection request forwarded by the stream proxy, the target edge node may establish the first communication connection between the cloud application client and the target edge node based on the first connection request. For the specific process of establishing the first communication connection between the cloud application client and the target edge node after the cloud application client switches from the first type of network to the second type of network, reference may be made to the description of operation S101 in the embodiment corresponding to FIG. 3, and details are not described herein again.

Operation S204: Acquire, based on the first communication connection, the object operation data forwarded by the stream proxy through a first node network address corresponding to the target edge node, after the object operation data is transmitted to the stream proxy by the cloud application client, a destination address of the object operation data being changed from a second node network address corresponding to the transit edge node to the first node network address.

In some embodiments, after the first communication connection is established between the cloud application client and the target edge node through the stream proxy, the cloud application client may generate object operation data based on the trigger operation in the cloud application display page. The cloud application client may display the cloud application display page. The cloud application display page may display the rendered pictures of the cloud application. The rendered pictures may refer to video frames in the second rendering data (the second rendering data may be second audio/video stream data) received by the cloud application client. The user may execute a trigger operation on the rendered picture displayed in the cloud application client, for example, execute a trigger operation for a function control in the rendered picture, to generate object operation data corresponding to the cloud application. The object operation data may refer to an instruction generated by the cloud application client based on the trigger operation in the cloud application display page.

After the object operation data is generated, the cloud application client may transmit the object operation data to the stream proxy in the transit edge node through the second type of network, and the stream proxy may forward the acquired object operation data to the target edge node, i.e., the target edge node may acquire the object operation data transmitted by the cloud application client through the stream proxy. The destination address of the object operation data transmitted by the cloud application client to the stream proxy through the second type of network is the second node network address corresponding to the transit edge node. In the stream proxy of the transit edge node, Destination Network Address Translation (DNAT) may be performed on the object operation data based on the routing and forwarding strategy in the stream proxy, such that the destination address of the object operation data is changed from the second node network address to the first node network address corresponding to the target edge node. In some embodiments, the cloud application client may transmit the object operation data in the form of udp (User Datagram Protocol) packets.

Further, after the DNAT is performed on the object operation data in the stream proxy, the stream proxy may forward the object operation data to the target edge node through the changed destination address, i.e., the target edge node may acquire the object operation data forwarded by the stream proxy through the first node network address. Service logic in the cloud application may be executed in the target edge node according to the object operation data to obtain service scene data matched with the object operation data, and the service scene data corresponding to the object operation data may be rendered by a container rendering technology in the target edge node to obtain rendering data of the cloud application. Of course, the rendering data generated by the target edge node based on the object operation data may also be transmitted to the cloud application client through the stream proxy in the transit edge node. For example, when the cloud application is a shooting cloud game, the object operation data may include a shooting instruction. The target edge node may render, after receiving the shooting instruction forwarded by the stream proxy, game pictures of the cloud game based on the shooting instruction. At this time, the game pictures may be shooting game pictures in the cloud game.

Operation S205: Transmit, based on the first communication connection, the first rendering data to the stream proxy such that the stream proxy changes a source address corresponding to the first rendering data from a second client network address to a first client network address, and forward, based on the first client network address, the first rendering data to the cloud application client.

In some embodiments, when the cloud application client switches from the first type of network to the second type of network, the rendering data generated after the network switching time may be called the first rendering data. For example, when the target edge node receives the object operation data after the network switching time, the rendering data generated based on the object operation data may also be called the first rendering data. The target edge node may transmit the first rendering data to the stream proxy in the transit edge node through a WebRTC interface (communication session interface). Since the network corresponding to the target edge node is the first type of network, the source address of the first rendering data transmitted by the target edge node to the stream proxy through the first type of network is: the second client network address of the cloud application client in the first type of network.

After receiving the first rendering data transmitted by the target edge node, the stream proxy in the transit edge node may perform Source Network Address Translation (SNAT) on the first rendering data based on the routing and forwarding strategy in the stream proxy, such that the source address of the first rendering data is changed from the second client network address of the cloud application client in the first type of network to the first client network address of the cloud application client in the second type of network. The first client network address and the second client network address are network addresses of the cloud application client in different carrier networks.

Further, after the SNAT is performed on the first rendering data in the stream proxy, the stream proxy in the transit edge node may forward the first rendering data to the cloud application client through the first client network address. After acquiring the first rendering data forwarded by the stream proxy, the cloud application client may decode the first rendering data to obtain decoded first rendering data, and output the decoded first rendering data in the cloud application client.

Figure 6:
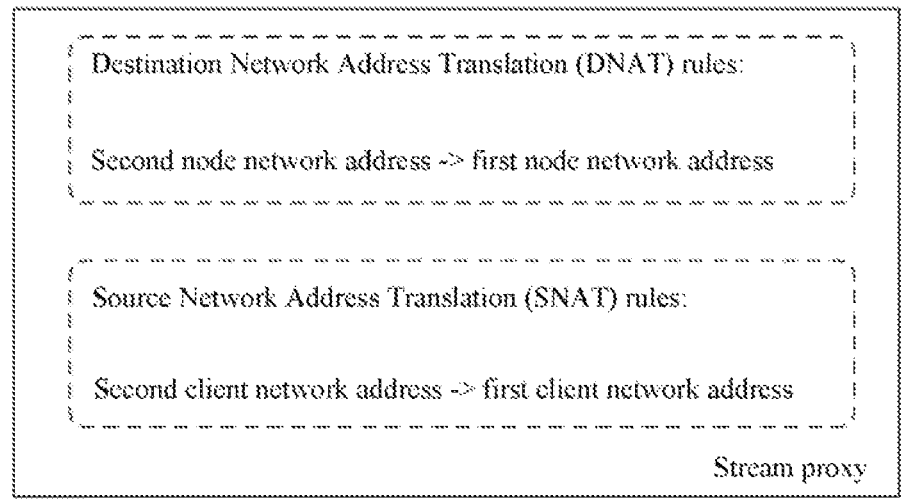
FIG. 6 is a schematic diagram of a routing and forwarding strategy in a stream proxy according to some embodiments.

FIG. 6 is a schematic diagram of a routing and forwarding strategy in a stream proxy according to some embodiments. The stream proxy in the transit edge node may be used for forwarding application data between the cloud application client and the target edge node. The forwarding operation of the stream proxy may be an object operation data forwarding operation and a rendering data forwarding operation. The object operation data forwarding operation may include: after the object operation data transmitted by the cloud application client is transmitted to the stream proxy in the transit edge node, the DNAT may be performed on the object operation data based on the routing and forwarding strategy in the stream proxy such that the destination address corresponding to the object operation data is changed from the second node network address to the first node network address, and then the object operation data may be forwarded to the target edge node corresponding to the first node network address. As shown in FIG. 6, the routing and forwarding strategy may be iptables rules in the stream proxy. DNAT rules corresponding to the second node network address are found out from a prerouting (data transit chain corresponding to the DNAT) table of the iptables rules; and the second node network address is changed to the first node network address corresponding to the target edge node, and the object operation data is forwarded to the target edge node corresponding to the first node network address.

In other words, the network type when the stream proxy forwards the object operation data is kept the same as that of the target edge node.

The rendering data forwarding operation may include: after the first rendering data generated by the target edge node is transmitted to the stream proxy in the transit edge node, the SNAT may be performed on the first rendering data based on the routing and forwarding strategy in the stream proxy such that the source address corresponding to the first rendering data is changed from the second client network address to the first client network address, and then, the first rendering data may be forwarded to the cloud application client corresponding to the first client network address. As shown in FIG. 6, SNAT rules corresponding to the second client network address are found out from the routing and forwarding strategy of the stream proxy; and the second client network address is changed to the first client network address of the cloud application client in the second type of network, and the first rendering data is forwarded to the cloud application client corresponding to the first client network address.

Operation S206: Stop, in a case that the application data transmitted through the stream proxy is an exit instruction for the cloud application client, running the cloud application in the target edge node, and delete the router registration information between the cloud application client and the target edge node in the routing and forwarding strategy included in the stream proxy.

In some embodiments, when the user executes an exit operation on the cloud application client, the cloud application client may generate an exit instruction for the cloud application in response to the exit operation for the cloud application client and close the cloud application client. In this case, the cloud application client may transmit the exit instruction as the object operation data to the stream proxy in the transit edge node through the second type of network, and the exit instruction may be transmitted to the target edge node through the stream proxy in the transit edge node. When the target edge node receives the exit instruction forwarded by the stream proxy, it indicates that the application data transmitted by the stream proxy is the exit instruction for the cloud application client and that the running of the cloud application may be stopped in the target edge node. Moreover, the router registration information between the cloud application client and the target edge node may also be deleted from the routing and forwarding strategy included in the stream proxy.

In some embodiments, when the application data transmitted through the stream proxy is the exit instruction for the cloud application client, it indicates that the user has already stopped using the cloud application. In this case, the running of the cloud application in the target edge node is stopped, and the router registration information between the cloud application client and the target edge node is deleted from the routing and forwarding strategy included in the stream proxy, which can avoid waste of resources.

Figure 7:
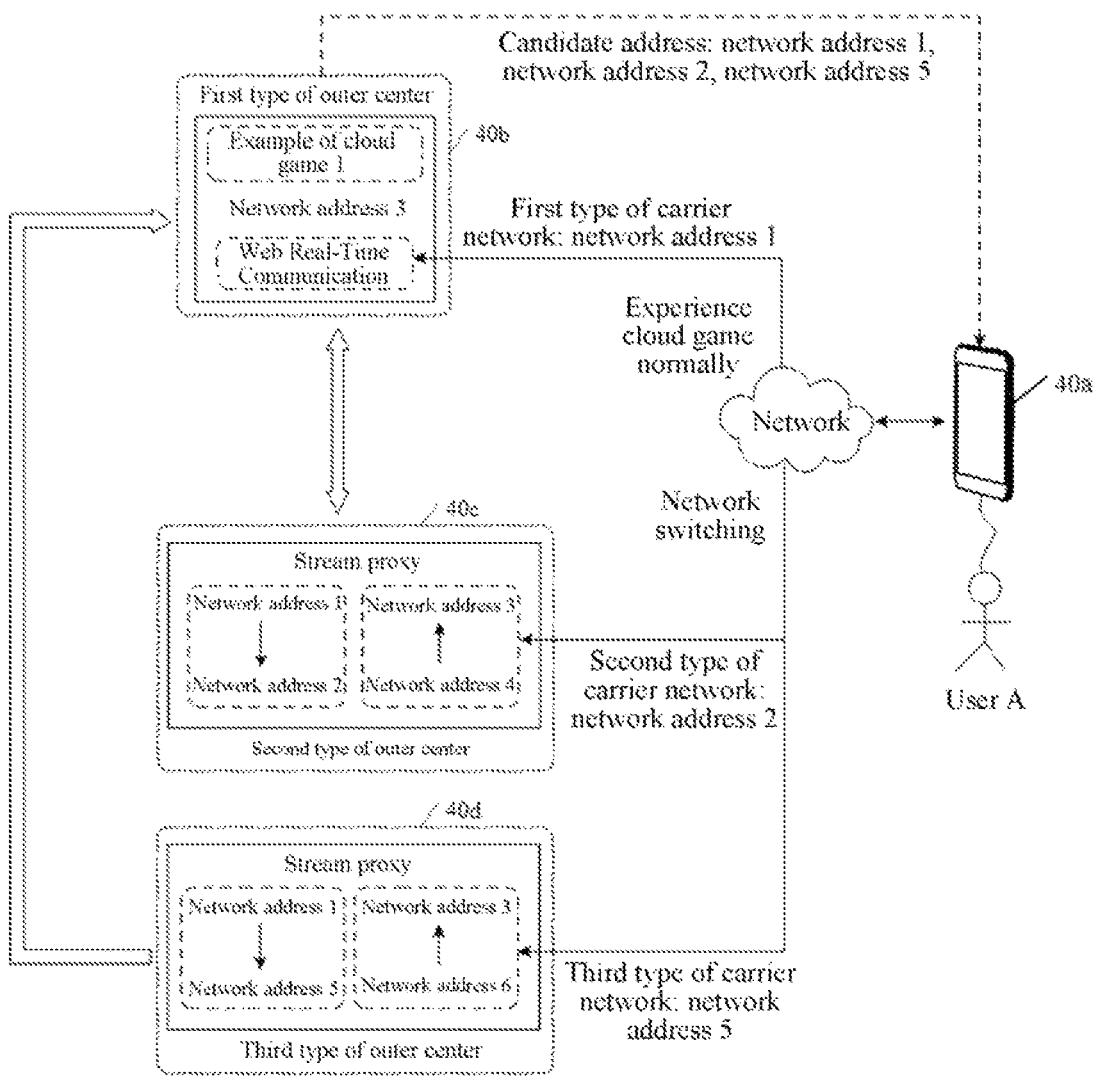
FIG. 7 is a schematic diagram showing a carrier network switching scene of cloud gaming according to some embodiments.

FIG. 7 is a schematic diagram showing a carrier network switching scene of cloud gaming according to some embodiments. The network switching process of the cloud application will be described below in an example where the cloud application is a cloud game. As shown in FIG. 7, the terminal device 40a may be an electronic device (e.g., the terminal device 10a in the processing system of the cloud application shown in FIG. 2 above) used by User A. The terminal device 40a may be integrated with one or more cloud games, such as a cloud game 1, a cloud game 2, . . . . It is assumed that the terminal device 40a may support a first type of carrier network (which may also be called a first type of network), a second type of carrier network (which may also be called a second type of network) and a third type of carrier network (which may also be called a third type of network).

When User A wants to experience the cloud games integrated in the terminal device 40*a*, he may select an interested cloud game (e.g., the cloud game 1) among the one or more cloud games integrated in the terminal device 40*a*, and a start operation may be executed on the cloud gaming client corresponding to the cloud game 1 selected by the user. At this time, the terminal device 40*a* may start the cloud gaming client corresponding to the cloud game 1 in the terminal device 40*a* in response to the start operation for the cloud gaming client through the carrier network used currently. As shown in FIG. 7, when the terminal device 40*a* starts the cloud gaming client corresponding to the cloud game 1 through the first type of carrier network, a first type of outer center 40*b* (i.e., target edge node) having the shortest distance from the cloud gaming client may be determined within a geographic area range (e.g., city) to which the terminal device 40*a* belongs, and the cloud game 1 may be deployed in the first type of outer center 40*b*, i.e., the cloud game 1 started by the terminal device 40*a* essentially runs in the first type of outer center 40*b*. Rendered data corresponding to the cloud game 1 (i.e., the second rendering data above) may be generated by rendering technology in the first type of outer center 40*b*. The second rendering data may be directly transmitted to the cloud gaming client in the terminal device 40*a* through a WebRTC interface in the first type of outer center 40*b*, and displayed to User A in the cloud gaming client.

Before the first type of outer center 40*b* transmits the second rendering data of the cloud game 1 to the cloud gaming client in the terminal device 40*a*, according to the first type of carrier network, the second type of carrier network and the third type of carrier network supported by the cloud application client, router registration information 1 between the cloud application client in the second type of network and the first type of outer center 40*b* may be added to the stream proxy of the second type of outer center 40*c* (i.e., the transit edge node above) corresponding to the second type of network, and router registration information 2 between the cloud application client in the third type of network and the first type of outer center 40*b* may be added to the stream proxy of the third type of outer center 40*d* (which may be called the candidate edge node) corresponding to the third type of network. The router registration information 1 may be added to the routing and forwarding strategy in the stream proxy of the second type of outer center 40*c*, and the router registration information 2 may be added to the routing and forwarding strategy in the stream proxy of the third type of outer center 40*d*. The router registration information 1 may include routing and forwarding information between the cloud application client in the second type of carrier network and the first type of outer center 40*b*, such as DNAT rules when the cloud application client transmits the object operation data through the second type of carrier network: network address 4 (i.e., second node network address above) of second type of outer center 40*c* corresponding to second carrier network→network address 3 (i.e., first node network address above) corresponding to first type of outer center 40*b*, and SNAT rules when the first type of outer center 40*b* transmits the rendering data (the first rendering data): network address 1 (i.e., second client network address above) of cloud application client in first type of carrier network→network address 2 (i.e., first client network address above) of cloud application client in second type of carrier network. The router registration information 2 may include routing and forwarding information between the cloud application client in the third type of carrier network and the first type of outer center 40*b*, such as DNAT rules when the cloud application client transmits the object operation data through the third type of carrier network: network address 6 (which may also be called third node network address) of third type of outer center 40*d* corresponding to third carrier network→network address 3 corresponding to first type of outer center 40*b*, and SNAT rules when the first type of outer center 40*b* transmits the first rendering data: network address 1 of cloud application client in first type of carrier network→network address 5 (which may also be called third client network address) of cloud application client in third type of carrier network.

As shown in FIG. 7, when the cloud application client switches from the first type of carrier network to the second type of carrier network, the object operation data generated in the cloud application client may be first transmitted to the stream proxy in the second type of outer center 40*c*, and then in the router registration information 1 included in the stream proxy of the second type of outer center 40*c*, the destination address of the object operation data may be changed from the network address 4 to the network address 3, so that the object operation data is forwarded to the first type of outer center 40*b* corresponding to the network address 3 through the stream proxy of the second type of outer center 40*c*. The first rendering data corresponding to the example of the cloud game 1 generated in the first type of outer center 40*b* may be first transmitted to the stream proxy in the second type of outer center 40*c*, and then in the router registration information 1 included in the stream proxy of the second type of outer center 40*c*, the source address of the first rendering data may be changed from the network address 1 to the network address 2, so that the first rendering data is forwarded to the cloud application client corresponding to the network address 2 through the stream proxy of the second type of outer center 40*c*.

Similarly, when the cloud application client switches from the first type of carrier network to the third type of carrier network, the object operation data generated in the cloud application client may be first transmitted to the stream proxy in the third type of outer center 40*d*, and then in the router registration information 2 included in the stream proxy of the third type of outer center 40*d*, the destination address of the object operation data may be changed from the network address 6 to the network address 3, so that the object operation data is forwarded to the first type of outer center 40*b* corresponding to the network address 3 through the stream proxy of the third type of outer center 40*d*. The first rendering data corresponding to the example of the cloud game 1 generated in the first type of outer center 40*b* may be first transmitted to the stream proxy in the third type of outer center 40*d*, and then in the router registration information 2 included in the stream proxy of the third type of outer center 40*d*, the source address of the first rendering data may be changed from the network address 1 to the network address 5, so that the first rendering data is forwarded to the cloud application client corresponding to the network address 5 through the stream proxy of the third type of outer center 40*d*.

In some embodiments, the cloud application may be a client of the cloud application running in the terminal device, or a cloud host. When the cloud application client switches between different carrier networks, the target outer center can be accessed without a carrier data conversion hotel, i.e., the target outer center can be accessed without crossing the network.

It is to be understood that in some embodiments, information such as the position of the user terminal device and the carrier to which the SIM card used by the terminal device belongs may be involved. In some embodiments, when applied to specific products or technologies, the permission and consent of the user are required, and the collection, use and processing of relevant data need to comply with relevant laws, regulations and standards of relevant countries and regions.

In some embodiments, when the cloud application client performs switches between different carrier networks, the application data of the cloud application can be transmitted between different types of network (carrier networks) through the stream proxy in the transit edge node corresponding to the switched network, i.e., the cloud application data can be transmitted between the cloud application client after network switching and the target edge node without cross-network access, which can reduce the transmission delay and network packet loss rate of the cloud application and further improve the quality of the cloud application, thereby improving the experience effect of the cloud application.

Figure 8:
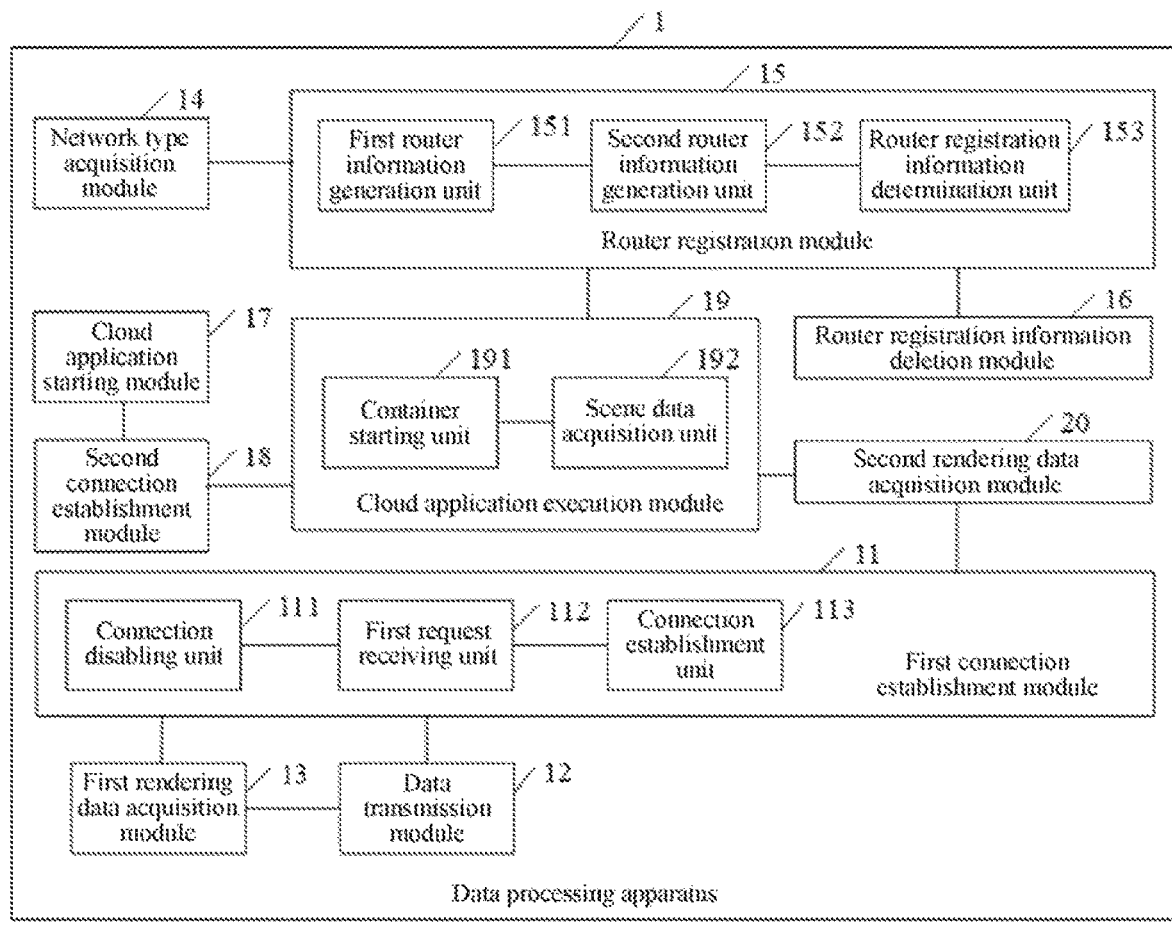
FIG. 8 is a schematic structural diagram of a data processing apparatus according to some embodiments.

FIG. 8 is a schematic structural diagram of a data processing apparatus according to some embodiments. As shown in FIG. 8, the data processing apparatus 1 may include: a first connection establishment module 11 and a data transmission module 12.

The first connection establishment module 11 is configured to receive, in a case that a cloud application client switches from a first type of network to a second type of network, a first connection request forwarded by a stream proxy in a transit edge node, and establish a first communication connection between the cloud application client and a target edge node based on the first connection request. the first connection request being transmitted by the cloud application client to the stream proxy based on the second type of network, the transit edge node being associated with the second type of network, the target edge node being associated with the first type of network, and a cloud application being deployed in the target edge node; and The data transmission module 12 is configured to transmit, based on the first communication connection, application data in the cloud application between the cloud application client and the target edge node through the stream proxy.

For specific functional implementation of the first connection establishment module 11 and the data transmission module 12, reference may be made to operation S101 to operation S102 in the embodiment corresponding to FIG. 3 above, and details are not described herein again.

In some embodiments, the first connection establishment module 11 includes: a connection disabling unit 111, a first request receiving unit 112 and a connection establishment unit 113.

The connection disabling unit 111 is configured to disable, in a case that the cloud application client switches from the first type of network to the second type of network, a second communication connection established between the cloud application client and the target edge node through the first type of network.

The first request receiving unit 112 is configured to receive the first connection request forwarded by the stream proxy in the transit edge node, and acquire a first client network address corresponding to the first connection request. The first client network address is used for characterizing a network address of the cloud application client in the second type of network.

The connection establishment unit 113 is configured to acquire a first node network address corresponding to the target edge node, and establish the first communication connection between the cloud application client and the target edge node through the first client network address and the first node network address corresponding to the target edge node.

For specific functional implementation of the connection disabling unit 111, the first request receiving unit 112 and the connection establishment unit 113, reference may be made to operation S101 in the embodiment corresponding to FIG. 3 above, and details are not described herein again.

In some embodiments, the application data includes first rendering data.

The data processing apparatus 1 further includes: a first rendering data acquisition module 13.

The first rendering data acquisition module 13 is configured to acquire the network switching time corresponding to the cloud application client, acquire the audio data and the one or more rendered pictures with the network switching time as the starting time in the target edge node, and combining the audio data and the one or more rendered pictures into the first rendering data.

The data transmission module 12 is configured to:
transmit, based on the first communication connection, the first rendering data to the stream proxy such that the stream proxy changes a source address corresponding to the first rendering data from a second client network address to a first client network address based on a routing and forwarding strategy, and forward, based on the first client network address, the first rendering data to the cloud application client.

The first client network address is used for characterizing a network address of the cloud application client in the second type of network, and the second client network address is used for characterizing a network address of the cloud application client in the first type of network.

In some embodiments, the application data includes object operation data.

The data transmission module 12 is configured to:
acquire, based on the first communication connection, the object operation data forwarded by the stream proxy through a first node network address corresponding to the target edge node.

The object operation data includes an instruction generated by the cloud application client based on a trigger operation in a cloud application display page. after the object operation data is transmitted to the stream proxy by the cloud application client, a destination address of the object operation data being changed from a second node network address corresponding to the transit edge node to the first node network address.

For specific functional implementation of the data transmission module 12 and the first rendering data acquisition module 13, reference may be made to operation S204 and operation S205 in the embodiment corresponding to FIG. 4 above, and details are not described herein again.

In some embodiments, the data processing apparatus 1 further includes: a network type acquisition module 14, a router registration module 15 and a router registration information deletion module 16.

The network type acquisition module 14 is configured to acquire, in a case that a second communication connection is established between the cloud application client and the target edge node through the first type of network, the first type of network and the second type of network supported by the cloud application client.

The router registration module 15 is configured to acquire, according to the first type of network and the second type of network, router registration information between the cloud application client and the target edge node, and add the router registration information to a routing and forwarding strategy included in the stream proxy.

The router registration information deletion module 16 is configured to stop, in a case that the application data transmitted through the stream proxy is an exit instruction for the cloud application client, running the cloud application in the target edge node, and delete the router registration information between the cloud application client and the target edge node in the routing and forwarding strategy included in the stream proxy.

For specific functional implementation of the network type acquisition module 14, the router registration module 15 and the router registration information deletion module 16, reference may be made to operation S201 to operation S202 and operation S206 in the embodiment corresponding to FIG. 4 above, and details are not described herein again.

In some embodiments, the router registration module 15 includes: a first router information generation unit 151, a second router information generation unit 152 and a router registration information determination unit 153.

The first router information generation unit 151 is configured to generate, according to a second node network address corresponding to the transit edge node and a first node network address corresponding to the target edge node, first routing and forwarding information between the cloud application client and the target edge node.

The second router information generation unit 152 is configured to generate, according to a first terminal network address of the cloud application client in the first type of network and a second terminal network address of the cloud application client in the second type of network, second routing and forwarding information between the target edge node and the cloud application client.

The router registration information determination unit 153 is configured to determine the first routing and forwarding information and the second routing and forwarding information as the router registration information corresponding to the cloud application client.

For specific functional implementation of the first router information generation unit 151, the second router information generation unit 152 and the router registration information determination unit 153, reference may be made to operation S202 in the embodiment corresponding to FIG. 4 above, and details are not described herein again.

In some embodiments, the data processing apparatus 1 further includes: a cloud application starting module 17, a second connection establishment module 18, a cloud application execution module 19 and a second rendering data acquisition module 20.

The cloud application starting module 17 is configured to receive, in a case that the cloud application client is started through the first type of network, a second connection request transmitted by the application client through the first type of network. The second connection request is transmitted before the cloud application client switches from the first type of network to the second type of network.

The second connection establishment module 18 is configured to acquire a second client network address corresponding to the second connection request, and establish a second communication connection between the cloud application client and the target edge node through the second client network address and a first node network address corresponding to the target edge node. The second client network address is used for characterizing a network address of the cloud application client in the first type of network.

The cloud application execution module 19 is configured to execute, in a case that the second communication connection is established between the cloud application client and the target edge node through the first type of network, service logic corresponding to the cloud application in the target edge node to obtain service scene data in the cloud application.

The second rendering data acquisition module 20 is configured to render the service scene data to obtain second rendering data corresponding to the cloud application, and transmit the second rendering data to the cloud application client through a communication session interface corresponding to the target edge node to enable the cloud application client to output the second rendering data.

In some embodiments, the cloud application execution module 19 includes: a container starting unit 191 and a scene data acquisition unit 192.

The container starting unit 191 is configured to acquire, in a case that the second communication connection is established between the cloud application client and the target edge node through the first type of network, parameter information corresponding to the cloud application, and start, according to the parameter information, a container matched with the cloud application in the target edge node.

The scene data acquisition unit 192 is configured to execute the service logic corresponding to the cloud application in the container to obtain the service scene data in the cloud application.

For specific functional implementation of the cloud application starting module 17, the second connection establishment module 18, the cloud application execution module 19, the second rendering data acquisition module 20, and the container starting unit 191 and the scene data acquisition unit 192 included in the cloud application execution module 19, reference may be made to operation S101 in the embodiment corresponding to FIG. 3 above, and details are not described herein again.

According to some embodiments, each module in the apparatus may exist respectively or be combined into one or more units. Certain (or some) unit in the units may be further split into multiple smaller function subunits, thereby implementing the same operations without affecting the technical effects of some embodiments. The modules are divided based on logical functions. In actual applications, a function of one module may be realized by multiple units, or functions of multiple modules may be realized by one unit. In some embodiments, the apparatus may further include other units. In actual applications, these functions may also be realized cooperatively by the other units, and may be realized cooperatively by multiple units.

A person skilled in the art would understand that these "modules" and "units" could be implemented by hardware logic, a processor or processors executing computer software code, or a combination of both. The "modules" and "units" may also be implemented in software stored in a memory of a computer or a non-transitory computer-readable medium, where the instructions of each module and unit are executable by a processor to thereby cause the processor to perform the respective operations of the corresponding module and unit.

In some embodiments, when the cloud application client performs switches between different carrier networks, the application data of the cloud application can be transmitted between different types of network (carrier networks) through the stream proxy in the transit edge node corresponding to the switched network, i.e., the cloud application data can be transmitted between the cloud application client after network switching and the target edge node without cross-network access, which can reduce the transmission delay and network packet loss rate of the cloud application and further improve the quality of the cloud application, thereby improving the experience effect of the cloud application.

Figure 9:
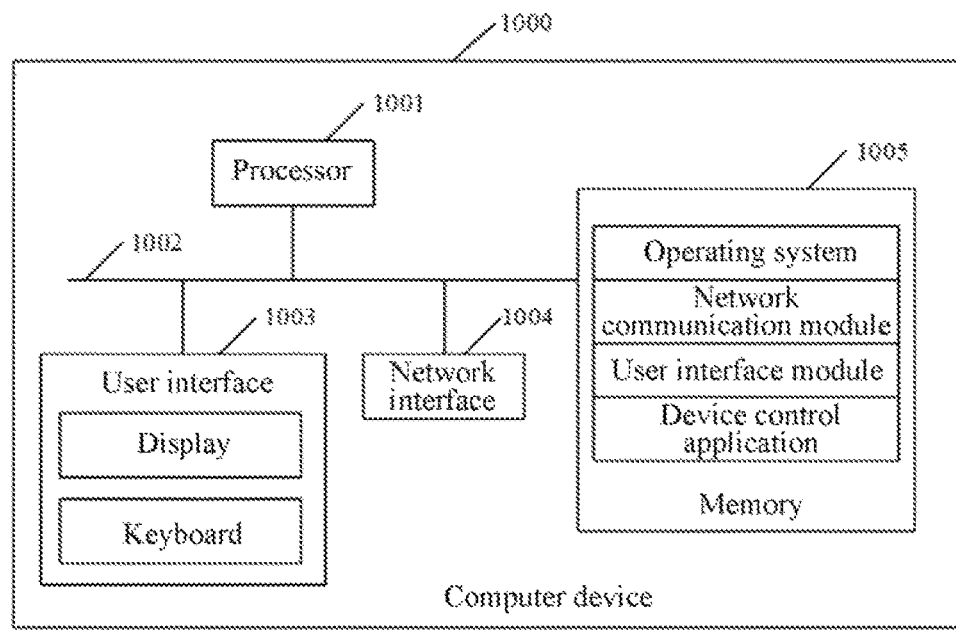
FIG. 9 is a schematic structural diagram of a computer device according to some embodiments.

FIG. 9 is a schematic structural diagram of a computer device according to some embodiments. As shown in FIG. 9, the computer device 1000 may be a terminal device (installed with a cloud application client) or a server (a cloud server for running cloud applications), which is not limited here. For the convenience of understanding, in an example where the computer device is a terminal device, the computer device 1000 may include: a processor 1001, a network interface 1004 and a memory 1005. In addition, the computer device 1000 may further include: a user interface 1003, and at least one communication bus 1002. The communication bus 1002 is configured to implement connection and communication between these components. The user interface 1003 may further include a standard wired interface and a standard wireless interface. The network interface 1004 in some embodiments may include a standard wired interface and a standard wireless interface (for example, a Wi-Fi interface). The memory 1005 may be a high-speed RAM memory, or a non-volatile memory, for example, at least one magnetic disk storage. The memory 1005 in some embodiments may be at least one storage apparatus that is located far away from the foregoing processor 1001. As shown in FIG. 9, the memory 1005 used as a computer-readable storage medium may include an operating system, a network communication module, a user interface module, and a device control application.

The network interface 1004 in the computer device 1000 may further provide a network communication function, and in some embodiments, the user interface 1003 may further include a display and a keyboard. In the computer device 1000 shown in FIG. 9, the network interface 1004 may provide a network communication function. The user interface 1003 is mainly configured to provide an input interface for users. The processor 1001 may be configured to invoke a device control application stored in the memory 1005, and perform the following operations:

receiving, in a case that a cloud application client switches from a first type of network to a second type of network, a first connection request forwarded by a stream proxy in a transit edge node, and establishing a first communication connection between the cloud application client and a target edge node based on the first connection request; the first connection request being transmitted by the cloud application client to the stream proxy based on the second type of network, the transit edge node being associated with the second type of network, the target edge node being associated with the first type of network, and a cloud application being deployed in the target edge node; and transmitting, based on the first communication connection, application data in the cloud application between the cloud application client and the target edge node through the stream proxy.

It is to be understood that the computer device 1000 described in some embodiments may execute the description for the data processing method in the embodiment corresponding to any of FIG. 3 and FIG. 4 above, or the description for the data processing apparatus 1 in the embodiment corresponding to FIG. 8 above, and details are not described herein again. In addition, the beneficial effects of the same method are not described herein again.

In addition, some applications further provide a computer-readable storage medium. The computer-readable storage medium stores a computer-readable instruction executed by the data processing apparatus 1 mentioned above. The computer-readable instruction includes a program instruction. When a processor executes the program instruction, the description for the data processing method in the embodiment corresponding to any of FIG. 3 and FIG. 4 above can be executed. Therefore, details are not described herein again. In addition, the beneficial effects of the same method are not described herein again. In addition, the beneficial effects of the same method are not described herein again. For technical details that are not disclosed in the computer-readable storage medium embodiments of the disclosure, reference may be made to the description for the method embodiments of the disclosure. As an example, the program instruction may be executed in a computing device, or in a plurality of computing devices located in one place, or in a plurality of computing devices that are distributed in a plurality of places and connected with each other through a communication network. The plurality of computing devices that are distributed in a plurality of places and connected with each other through a communication network may form a blockchain system.

In addition, some embodiments further provide a computer program product. The computer program product may include computer-readable instructions. The computer-readable instructions may be stored in one or more computer-readable storage media. One or more processors of a computer device read the computer-readable instructions from the computer-readable storage medium. The processor may execute the computer-readable instructions such that the computer device executes the description for the data processing method in the embodiment corresponding to any of FIG. 3 and FIG. 4 above. Therefore, details are not described herein again. In addition, the beneficial effects of the same method are not described herein again. For technical details that are not disclosed in the computer program product embodiments of the disclosure, reference may be made to the description for the method embodiments of the disclosure.

For the foregoing method embodiments, for the sake of simple description, they are all expressed as a combination of a series of actions, but those skilled in the art shall know that the described sequence of actions is not limited herein, because according to the disclosure, some operations can be performed in other sequences or simultaneously. In addition, those skilled in the art shall also know that the embodiments described in the specification are all preferred embodiments, and the actions and modules involved are not necessarily mandatory to the disclosure.

The operations of the methods of some embodiments may be reordered, combined, or deleted according to an actual requirement.

The modules in the apparatuses of some embodiments may be combined, divided, or deleted according to an actual requirement.

A person of ordinary skill in the art may understand that all or some procedures in the methods in the foregoing embodiments may be implemented by a computer-readable instruction instructing relevant hardware. The computer-readable instruction may be stored in one or more computer-readable storage media. When the computer-readable instruction is executed, the procedures of the foregoing method embodiments may be included. The storage medium may be a magnetic disc, an optical disc, a read-only memory (ROM), a random access memory (RAM), or the like.

The foregoing embodiments are used for describing, instead of limiting the technical solutions of the disclosure. A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. A data processing method, performed by a target edge node, comprising:

receiving, based on a cloud application client switching from a first type of network to a second type of network, a first connection request forwarded by a stream proxy in a transit edge node, and establishing a first communication connection between the cloud application client and the target edge node based on the first connection request, the first connection request being transmitted by the cloud application client to the stream proxy based on the second type of network, the transit edge node being associated with the second type of network, the target edge node being associated with the first type of network, and a cloud application being deployed in the target edge node; and transmitting, based on the first communication connection, application data in the cloud application between the cloud application client and the target edge node through the stream proxy, the application data comprising first rendering data and object operation data, and the first rendering data comprising audio data and one or more rendered pictures acquired with network switching time of the cloud application client as a starting time.

2. The data processing method according to claim 1, wherein the receiving comprises:

disabling, based on the cloud application client switching from the first type of network to the second type of network, a second communication connection established between the cloud application client and the target edge node through the first type of network;

receiving the first connection request forwarded by the stream proxy in the transit edge node, and acquiring a first client network address corresponding to the first connection request; the first client network address characterizing a network address of the cloud application client in the second type of network; and acquiring a first node network address corresponding to the target edge node, and establishing the first communication connection between the cloud application client and the target edge node through the first client network address and the first node network address.

3. The data processing method according to claim 1, wherein the application data comprises the first rendering data;

the data processing method further comprises:

acquiring the network switching time corresponding to the cloud application client, acquiring the audio data and the one or more rendered pictures with the network switching time as the starting time in the target edge node, and combining the audio data and the one or more rendered pictures into the first rendering data; and the transmitting comprises:

transmitting, based on the first communication connection, the first rendering data to the stream proxy such that the stream proxy changes a source address corresponding to the first rendering data from a second client network address to a first client network address, and forwarding, based on the first client network address, the first rendering data to the cloud application client;

wherein the first client network address characterizes a network address of the cloud application client in the second type of network, and the second client network address characterizes a network address of the cloud application client in the first type of network.

4. The data processing method according to claim 1, wherein the application data comprises the object operation data; and the transmitting comprises:

acquiring, based on the first communication connection, the object operation data forwarded by the stream proxy through a first node network address corresponding to the target edge node;

wherein the object operation data comprises an instruction generated by the cloud application client based on a trigger operation in a cloud application display page; and after the object operation data is transmitted to the stream proxy by the cloud application client, a destination address of the object operation data is changed from a second node network address corresponding to the transit edge node to the first node network address.

5. The data processing method according to claim 1, further comprising:

acquiring, based on a second communication connection being established between the cloud application client and the target edge node through the first type of network, the first type of network and the second type of network supported by the cloud application client; and acquiring, according to the first type of network and the second type of network, router registration information between the cloud application client and the target edge node, and adding the router registration information to a routing and forwarding strategy comprised in the stream proxy; the router registration information comprising routing and forwarding information between the first type of network and the second type of network.

6. The data processing method according to claim 5, wherein the acquiring, according to the first type of network and the second type of network, the router registration information between the cloud application client and the target edge node comprises:

generating, according to a first node network address corresponding to the target edge node and a second node network address corresponding to the transit edge node, first routing and forwarding information between the cloud application client and the target edge node;

generating, according to a second client network address of the cloud application client in the first type of network and a first client network address of the cloud application client in the second type of network, second routing and forwarding information between the cloud application client and the target edge node; and determining the first routing and forwarding information and the second routing and forwarding information as the router registration information between the cloud application client and the target edge node.

7. The data processing method according to claim 5, further comprising:
stopping, based on the application data transmitted through the stream proxy being an exit instruction for the cloud application client, running the cloud application in the target edge node, and deleting the router registration information between the cloud application client and the target edge node in the routing and forwarding strategy comprised in the stream proxy.

8. The data processing method according to claim 1, further comprising:
receiving, based on the cloud application client starting through the first type of network, a second connection request transmitted by the cloud application client through the first type of network; the second connection request being transmitted before the cloud application client switches from the first type of network to the second type of network; and
acquiring a second client network address corresponding to the second connection request, and establishing a second communication connection between the cloud application client and the target edge node through the second client network address and a first node network address corresponding to the target edge node; the second client network address characterizing a network address of the cloud application client in the first type of network.

9. The data processing method according to claim 8, further comprising:
executing, based on the second communication connection being established between the cloud application client and the target edge node through the first type of network, service logic corresponding to the cloud application in the target edge node to obtain service scene data in the cloud application; and
rendering the service scene data to obtain second rendering data corresponding to the cloud application, and transmitting the second rendering data to the cloud application client through a communication session interface corresponding to the target edge node to enable the cloud application client to output the second rendering data.

10. The data processing method according to claim 9, wherein the executing comprises:
acquiring, based on the second communication connection being established between the cloud application client and the target edge node through the first type of network, parameter information corresponding to the cloud application, and starting, according to the parameter information, a container matched with the cloud application in the target edge node; and
executing the service logic corresponding to the cloud application in the container to obtain the service scene data in the cloud application.

11. A data processing apparatus, comprising:
at least one memory configured to store program code; and
at least one processor configured to read the program code and operate as instructed by the program code, the program code comprising:
first connection establishment code configured to cause the at least one processor to receive, based on a cloud application client switching from a first type of network to a second type of network, a first connection request forwarded by a stream proxy in a transit edge node, and establish a first communication connection between the cloud application client and a target edge node based on the first connection request; the transit edge node being associated with the second type of network, the target edge node being associated with the first type of network, and a cloud application being deployed in the target edge node; and
data transmission code configured to cause the at least one processor to transmit, based on the first communication connection, application data in the cloud application between the cloud application client and the target edge node through the stream proxy; the application data comprising first rendering data and object operation data, and the first rendering data comprising audio data and one or more rendered pictures acquired with network switching time of the cloud application client as a starting time.

12. The data processing apparatus according to claim 11, wherein the first connection establishment code is further configured to cause the at least one processor to:
disable, based on the cloud application client switching from the first type of network to the second type of network, a second communication connection established between the cloud application client and the target edge node through the first type of network;
receive the first connection request forwarded by the stream proxy in the transit edge node, and acquire a first client network address corresponding to the first connection request; the first client network address characterizing a network address of the cloud application client in the second type of network; and
acquire a first node network address corresponding to the target edge node, and establish the first communication connection between the cloud application client and the target edge node through the first client network address and the first node network address.

13. The data processing apparatus according to claim 11, wherein the application data comprises the first rendering data;
the program code further comprises first rendering data code configured to cause the at least one processor to:
acquire the network switching time corresponding to the cloud application client, acquiring the audio data and the one or more rendered pictures with the network switching time as the starting time in the target edge node, and combining the audio data and the one or more rendered pictures into the first rendering data; and
the data transmission code is further configured to cause the at least one processor to:
transmit, based on the first communication connection, the first rendering data to the stream proxy such that the stream proxy changes a source address corresponding to the first rendering data from a second client network address to a first client network address, and forwarding, based on the first client network address, the first rendering data to the cloud application client;
wherein the first client network address characterizes a network address of the cloud application client in the second type of network, and the second client network address characterizes a network address of the cloud application client in the first type of network.

14. The data processing apparatus according to claim 11, wherein the application data comprises the object operation data; and
the data transmission code is further configured to cause the at least one processor to:

acquire, based on the first communication connection, the object operation data forwarded by the stream proxy through a first node network address corresponding to the target edge node;

wherein the object operation data comprises an instruction generated by the cloud application client based on a trigger operation in a cloud application display page; and after the object operation data is transmitted to the stream proxy by the cloud application client, a destination address of the object operation data is changed from a second node network address corresponding to the transit edge node to the first node network address.

15. The data processing apparatus according to claim 11, wherein the program code further comprises:

network type acquisition code configured to cause the at least one processor to acquire, based on a second communication connection being established between the cloud application client and the target edge node through the first type of network, the first type of network and the second type of network supported by the cloud application client; and router registration code configured to cause the at least one processor to acquire, according to the first type of network and the second type of network, router registration information between the cloud application client and the target edge node, and add the router registration information to a routing and forwarding strategy comprised in the stream proxy; the router registration information comprising routing and forwarding information between the first type of network and the second type of network.

16. The data processing apparatus according to claim 15, wherein the router registration code is further configured to cause the at least one processor to:

generate, according to a first node network address corresponding to the target edge node and a second node network address corresponding to the transit edge node, first routing and forwarding information between the cloud application client and the target edge node;

generate, according to a second client network address of the cloud application client in the first type of network and a first client network address of the cloud application client in the second type of network, second routing and forwarding information between the cloud application client and the target edge node; and determine the first routing and forwarding information and the second routing and forwarding information as the router registration information between the cloud application client and the target edge node.

17. The data processing apparatus according to claim 15, wherein the program code further comprises:

router registration information deletion code configured to cause the at least one processor to stop, based on the application data transmitted through the stream proxy being an exit instruction for the cloud application client, running the cloud application in the target edge node, and delete the router registration information between the cloud application client and the target edge node in the routing and forwarding strategy comprised in the stream proxy.

18. The data processing apparatus according to claim 11, wherein the program code further comprises:

cloud application starting code configured to cause the at least one processor to receive, based on the cloud application client starting through the first type of network, a second connection request transmitted by the cloud application client through the first type of network; the second connection request being transmitted before the cloud application client switches from the first type of network to the second type of network; and second connection establishment code configured to cause the at least one processor to acquire a second client network address corresponding to the second connection request, and establish a second communication connection between the cloud application client and the target edge node through the second client network address and a first node network address corresponding to the target edge node; the second client network address characterizing a network address of the cloud application client in the first type of network.

19. The data processing apparatus according to claim 18, wherein the program code further comprises:

cloud application execution code configured to cause the at least one processor to execute, based on the second communication connection being established between the cloud application client and the target edge node through the first type of network, service logic corresponding to the cloud application in the target edge node to obtain service scene data in the cloud application; and second rendering data acquisition code configured to cause the at least one processor to render the service scene data to obtain second rendering data corresponding to the cloud application, and transmit the second rendering data to the cloud application client through a communication session interface corresponding to the target edge node to enable the cloud application client to output the second rendering data.

20. A non-transitory computer-readable storage medium, storing computer code that when executed by at least one processor causes the at least one processor to:

receive, based on a cloud application client switching from a first type of network to a second type of network, a first connection request forwarded by a stream proxy in a transit edge node, and establish a first communication connection between the cloud application client and the target edge node based on the first connection request; the first connection request being transmitted by the cloud application client to the stream proxy based on the second type of network, the transit edge node being associated with the second type of network, the target edge node being associated with the first type of network, and a cloud application being deployed in the target edge node; and transmit, based on the first communication connection, application data in the cloud application between the cloud application client and the target edge node through the stream proxy; the application data comprising first rendering data and object operation data, and the first rendering data comprising audio data and one or more rendered pictures acquired with network switching time of the cloud application client as a starting time.

* * * * *